(12) United States Patent
Tsur

(10) Patent No.: US 10,255,479 B2
(45) Date of Patent: Apr. 9, 2019

(54) METHODS AND SYSTEMS FOR SIGNATURE ANALYSIS AND AUTHENTICATION

(71) Applicant: SIGNPASS LTD., Kfar-Saba (IL)

(72) Inventor: Doron Tsur, Kfar-Saba (IL)

(73) Assignee: SIGNPASS LTD., Kfar-Saba (IL)

( * ) Notice: Subject to any disclaimer, the term of this patent is extended or adjusted under 35 U.S.C. 154(b) by 309 days.

(21) Appl. No.: 15/306,297

(22) PCT Filed: Apr. 19, 2015

(86) PCT No.: PCT/IL2015/050415
§ 371 (c)(1),
(2) Date: Oct. 24, 2016

(87) PCT Pub. No.: WO2015/162607
PCT Pub. Date: Oct. 29, 2015

(65) Prior Publication Data
US 2017/0046560 A1   Feb. 16, 2017

Related U.S. Application Data

(60) Provisional application No. 61/982,919, filed on Apr. 23, 2014.

(51) Int. Cl.
*G06K 9/00* (2006.01)
*G06F 21/32* (2013.01)
(Continued)

(52) U.S. Cl.
CPC ......... *G06K 9/00181* (2013.01); *G06F 21/32* (2013.01); *G06Q 20/02* (2013.01);
(Continued)

(58) Field of Classification Search
CPC . G06K 9/00154–9/00201; G06F 21/32; G06Q 20/02; G06Q 20/12; G06Q 20/20;
(Continued)

(56) References Cited

U.S. PATENT DOCUMENTS 5,434,928 A    7/1995  Wagner et al.
6,356,650 B1 *  3/2002  Wirtz ................. G06K 9/00154
                                                   382/119

(Continued)

*Primary Examiner* — Sean T Motsinger
(74) *Attorney, Agent, or Firm* — Cozen O'Connor

(57) ABSTRACT

A method for training a classifier for authenticating signatures hand-drawn on an electronic input element includes receiving a set of multiple signature properties of each of multiple signatures documented over a time range of a common user, each set of multiple signature properties is associated with a time period during which a respective signature was documented at the time range, wherein the plurality of signatures were hand-drawn and digitally recorded using an electronic input element; generating a signature authenticating classifier for authenticating additional signatures of the common user based on the set of multiple signature properties of each of the plurality of signatures, wherein a weight assigned to each the set of multiple signature properties or a portion thereof decreases overtime, the weight is used for the generation of the classifier; and providing the signature authenticating classifier for authenticating the additional signatures.

18 Claims, 6 Drawing Sheets

(51) Int. Cl.
  *G06Q 20/02* (2012.01)
  *G06Q 20/12* (2012.01)
  *G06Q 20/20* (2012.01)
  *G06Q 20/32* (2012.01)
  *G06Q 20/36* (2012.01)
  *G06Q 20/40* (2012.01)

(52) U.S. Cl.
  CPC ............. *G06Q 20/12* (2013.01); *G06Q 20/20* (2013.01); *G06Q 20/325* (2013.01); *G06Q 20/3227* (2013.01); *G06Q 20/363* (2013.01); *G06Q 20/40145* (2013.01)

(58) Field of Classification Search
  CPC ............. G06Q 20/3227; G06Q 20/325; G06Q 20/363; G06Q 20/40145
  See application file for complete search history.

(56) References Cited

U.S. PATENT DOCUMENTS

| | | | | |
|---|---|---|---|---|
| 6,587,577 | B1 * | 7/2003 | Finkelstein | G06K 9/00154 382/116 |
| 9,563,926 | B2 * | 2/2017 | Avni | G06T 1/0021 |
| 9,741,085 | B2 * | 8/2017 | Avni | G06T 1/0021 |
| 10,043,056 | B1 * | 8/2018 | Danyluk | G06K 9/00181 |
| 2002/0006214 | A1 * | 1/2002 | Karlsson | G06K 9/00154 382/119 |
| 2003/0142855 | A1 * | 7/2003 | Kuo | G06K 9/00154 382/119 |
| 2003/0179912 | A1 * | 9/2003 | Murase | G06K 9/00154 382/119 |
| 2003/0179913 | A1 | 9/2003 | Murase et al. | |
| 2003/0233557 | A1 * | 12/2003 | Zimmerman | G06K 9/00154 713/186 |
| 2004/0203594 | A1 * | 10/2004 | Kotzin | G06K 9/00154 455/411 |
| 2007/0086628 | A1 * | 4/2007 | Fuchs | G06K 9/00154 382/119 |
| 2007/0292002 | A1 * | 12/2007 | Kaplan | G06K 9/00181 382/119 |
| 2008/0152202 | A1 * | 6/2008 | Moise | G06K 9/00154 382/120 |
| 2010/0225443 | A1 * | 9/2010 | Bayram | G06F 21/316 340/5.83 |
| 2010/0254578 | A1 * | 10/2010 | Modir Shanechi | G06K 9/00167 382/119 |
| 2011/0238510 | A1 | 9/2011 | Rowen et al. | |
| 2014/0052994 | A1 | 2/2014 | Sabin et al. | |
| 2014/0072185 | A1 | 3/2014 | Dunlap et al. | |
| 2014/0281945 | A1 * | 9/2014 | Avni | G06T 1/0021 715/268 |
| 2016/0078277 | A1 * | 3/2016 | Sprigg | G06K 9/00174 382/119 |
| 2017/0046560 | A1 * | 2/2017 | Tsur | G06F 21/32 |
| 2018/0285625 | A1 * | 10/2018 | Danyluk | G06K 9/00181 |

\* cited by examiner

METHODS AND SYSTEMS FOR SIGNATURE ANALYSIS AND AUTHENTICATION

BACKGROUND

The present invention, in some embodiments thereof, relates to systems and methods for authentication of users and, more specifically, but not exclusively, to systems and methods for authentication of user signatures.

Users may require authentication of identify when performing financial transactions, agreeing to contracts, or for other reasons. Authentication may be performed in different ways. On possible way is based on a signature of the user. The user hand writes a signature (e.g., onto a piece of paper). The signature may then be compared to a previous sample of the user, such as on the back of a credit card, on a driver's license, or on a passport.

Signature comparison may be manually and/or visually performed, for example, a teller at a cash register visually compares the signature of the customer on the bill to the signature sample of the customer on the back of the credit card used to pay the bill.

Hand written signatures may be digitized. The customer may sign on a touch sensitive pad, such as using a stylus pointer (instead of a pen). The resulting signature is digitized and analyzed. Hand written signatures may also be digitized by being scanned from a paper. The digitized signatures may be compared by a software algorithm to another signature of the user based on the visual appearance of the signature, for example, the curvature of certain letter, or other visual features.

However, the manual and/or electronic signature analysis methods are prone to forgery. A forger that is able to write a signature that looks similar to the signature of the real customer may succeed in impersonating the customer, and thereby able to perform transactions by impersonating the real customer. For example, the forger may make purchases or transfer money, with the customer responsible for the financial transactions.

SUMMARY

According to an aspect of some embodiments of the present invention there is provided a method for training a classifier for authenticating signatures hand-drawn on an electronic input element, comprising: receiving a set of multiple signature properties of each of multiple signatures documented over a time range of a common user, each set of multiple signature properties is associated with a time period during which a respective signature was documented at the time range, wherein the plurality of signatures were hand-drawn and digitally recorded using an electronic input element; generating a signature authenticating classifier for authenticating additional signatures of the common user based on the set of multiple signature properties of each of the plurality of signatures, wherein a weight assigned to each the set of multiple signature properties or a portion thereof decreases over time, the weight is used for the generation of the classifier; and providing the signature authenticating classifier for authenticating the additional signatures.

Optionally, generating the signature authenticating classifier comprises: generating a first baseline classifier based on the set of plurality of signature properties of each of the plurality of signatures documented over the time range to provide a baseline for generation of a second authentication classifier; and generating the second authentication classifier based on a subset of the set of plurality of signature properties of each of the plurality of signatures having more recent time periods, using the first classifier as the baseline.

Optionally, the first classifier is generated off-line, and the second classifier is generated during run-time after receiving the signature for authentication from the common user.

Optionally, the first classifier is generated based on static characteristics of features extracted from the set of plurality of signature properties of each of the plurality of signatures documented over the time range, and the second classifier is generated based on dynamic characteristics of features extracted from the subset of set of plurality of signature properties of each of the plurality of documented signatures.

Optionally, the first classifier is generated based on documented signatures for multiple different users, and the second classifier is generated based on documented signatures of the common user.

Optionally, generating the signature authenticating classifier comprises: calculating multiple adjustment factors based on the set of plurality of signature properties of each of the plurality of signatures documented over the time range, the adjustment factors providing baseline values for classification; training the signature authenticating classifier based on the set of plurality of signature properties of each of the plurality of signatures with assigned weights; and calibrating the signature authenticating classifier based on the adjustment factors to adapt the generated signature authenticating classifier to time related changes of the set of plurality of signature properties of each of the plurality of signatures.

Optionally, the method further comprises extracting multiple features from the set of plurality of signature properties of each of the plurality of signatures for generating the classifier, the features including non-visual features that differ when the signature for authentication is visually indistinguishable to the signatures.

Optionally, the non-visual features includes at least one member of a group consisting of: duration of maximum speed, duration of the first stroke, duration of the whole signature, action of pointer, pressure applied by pointer to a screen, orientation of pointer relative to the screen.

Optionally, the non-visual features denote aspects of the signing process related to muscle memory and/or intuitive movement.

Optionally, the method further comprises assigning a first set of feature specific weight coefficients based on statistical patterns of the set of plurality of signature properties of each of the plurality of signatures from multiple different users, and assigning a second set of feature specific weight coefficients based on common user specific historical patterns, wherein the feature specific weight coefficients represent relative importance of features in classification.

Optionally, the method further comprises assigning a first set of feature specific weight coefficients based on statistical patterns of the set of plurality of signature properties of each of the plurality of signatures from multiple different users, and adapting the first set of feature specific weight coefficients to a specific common user based on common user specific historical patterns, wherein the feature specific weight coefficients represent relative importance of features in classification.

Optionally, the classifier is generated to authenticate additional common user signature with a predefined false positive rate and/or false negative rate. Optionally, the predefined false positive rate is dynamic, decreasing over time with increasing numbers of consistent additional common user signatures.

According to an aspect of some embodiments of the present invention there is provided a method for authenticating signatures hand-drawn and digitally recorded using an electronic input element, comprising: receiving a signature authentication classifier for authenticating signatures of a common user based on a set of multiple signature properties of each of multiple signatures documented over a time range of the common user, wherein a weight assigned to each the set of multiple signature properties or a portion thereof decreases over time, the weight is used for the generation of the classifier; receiving, from the common user, a signature for authentication, the signature being hand-drawn and digitally recorded using an electronic input element; and authenticating the received signature by applying the classifier to the received signature.

Optionally, the method further comprises calculating a user volatility factor based on features extracted from the set of plurality of signature properties of each of plurality of signatures of the common user, the volatility factor denoting the accuracy of similarity between time spaced signatures of the common user and the received signature, and authenticating comprises verifying that features extracted from the received signature are within a tolerance level based on the calculated user volatility factor.

Optionally, authenticating comprises: calculating mean and standard deviation from weighted features of the signature authentication classifier; extracting features from the signature for authentication, and comparing the extracted features within tolerance boundaries based on the calculated mean and standard deviation of the weighted features of the classifier. Optionally, the method further comprises calculating a user volatility factor, and comparing the extracted features within tolerance boundaries that vary based on the user volatility factor.

Optionally, the method further comprises documenting the received signature and authentication result, and updating the signature authenticating classifier based on the documented received signature and authentication result, so that the classifier adapts to changes of the common user signatures over time.

Optionally, the method further comprises receiving, from a merchant or a financial clearing company, a request for authentication of the common user, and generating a notification to the common user to provide the signature for authentication. Optionally, the request for authentication is based on a request of the common user to perform a financial transaction, wherein the common user is identified based on a unique identification number.

Optionally, applying the classifier comprises: extracting features from the received signature for authentication; weighing each of the extracted features using calculated feature specific coefficients from the received signature authenticating classifier; counting the total number of features that pass a variance check (referred to as a pass count) for each feature, the variance check for each feature denoted by the relationship:

$$(Feature-Mean)<=(Stddv*Volatility)$$

wherein: Feature denotes the values of the respective weighted extracted feature; Mean denotes the mean value of the respective feature for the signatures; Stddv denotes the standard deviation value of the respective feature for the signatures;
Volatility denotes the volatility factor of the respective feature for the signatures; the Mean, Stddv, and Volatility obtained from the received signature authenticating classifier; and authenticating the received signature based on the relationship:

$$(Pass\ Count)>=Threshold;$$

wherein Pass count denotes the total number of extracted features that passed the variance check; wherein Threshold denotes the number of extracted features that need to pass the variance check in order to authenticate the signature.

According to an aspect of some embodiments of the present invention there is provided a system for authenticating signatures hand-drawn on an electronic input element, comprising: a processor; a memory having stored thereon program modules for instruction execution by the processor, comprising: a signature database storing a set of multiple signature properties of each of multiple signatures documented over a time range of a common user, each set of multiple signature properties is associated with a time period during which a respective signature was documented at the time range, wherein the plurality of signatures were hand-drawn and digitally recorded using an electronic input element; a classifier generation module for generating a signature authenticating classifier for authenticating additional signatures of the common user based on the set of multiple signature properties of each of the plurality of signatures, wherein a weight assigned to each the set of multiple signature properties or a portion thereof decreases over time, the weight is used for the generation of the classifier; and an authentication module for authenticating a signature received from a user, by applying the classifier to the received signature.

Optionally, the electronic input device includes at least one member of a group consisting of: an independent touch screen module, a smartphone with touch screen, a computer with touch screen, a tablet with touch screen, a touch pad, an accelerometer of a smartwatch on the hand of the signing user, and an imager.

Optionally, the system resides in a computing cloud.

Optionally, the system further comprises cloud endpoint modules for providing mobile and/or internet communication for users and merchants with the system.

Optionally, the system further comprises a mobile device for communication with the processor, the mobile device having stored thereon a user mobile application including at least one member of a feature group consisting of: initial user registration, signature sample request, mobile device registration and management, user profile management, and merchant specific user profile data management.

Optionally, the system further comprises a merchant terminal client for communicating with the processor, the merchant terminal client having stored thereon a merchant mobile application including at least one member of a feature group consisting of: managing a merchant account, registering new merchant systems, configure remote authentication triggering, and receiving a user ID for identification from a mobile device of the user running a user mobile application.

According to an aspect of some embodiments of the present invention there is provided a method for authenticating manually created signatures hand-drawn and digitally recorded using an electronic input element, comprising: receiving manually created signatures for authentication, each manually created signature received from each of multiple common users, the manually created signatures recorded at multiple electronic input devices which are distributed along multiple geographically remote merchants; transmitting the signatures or plurality of signature properties of the signatures to a central server; authenticating each of the received signatures of each respective common users, at the central server, based on historically documented manual signatures of each respective common user; and providing each respective authentication result to each respective geographically remote merchant.

Optionally, authenticating comprises authenticating the received signature of the common user by applying a signature authentication classifier generated based on the historically documented manual signatures of the respective common user.

Optionally, a weight is assigned to each set of multiple signature properties of the received signature or a portion thereof, wherein the weight decreases over time, the weight is used for the authentication of the respective received signature.

According to an aspect of some embodiments of the present invention there is provided a system for authenticating manually created signatures hand-drawn on an electronic input element, comprising: a signature authentication server comprising: a processor; a network interface for receiving manually created signatures for authentication, each manually created signature received from each of multiple common users, the manually created signatures recorded at multiple electronic input devices which are distributed along multiple geographically remote merchants, the network interface for providing an authentication result to each respective geographically remote merchant; a memory having stored thereon program modules for instruction execution by the processor, comprising: a signature database storing multiple historically documented manual signatures for each of multiple common users, each signature digitally recorded by being hand drawn on an electronic input element; and an authentication module for authenticating each of the received signatures of each respective common users, based on historically documented manual signatures of each respective common user.

Optionally, the server further comprises a classifier module for generating a signature authentication classifier for the respective common user based on the signature database, the classifier generated based on a weight assigned to each set of multiple signature properties of the signatures in the signature database or a portion thereof, wherein the weight decreases over time, the weight is used for the authentication of the respective received signature, and wherein the authentication module authenticates the respective received signature by applying the generated classifier.

According to an aspect of some embodiments of the present invention there is provided a method for authenticating signatures hand-drawn and digitally recorded using an electronic input element, comprising: receiving from a common user, at a client terminal, a signature for authentication, the signature being hand-drawn and digitally recorded using an electronic input element; transmitting the signature or plurality of signature properties of the signature to a central server; authenticating the received signature of the common user, at the central server, by applying a signature authentication classifier generated based on a set of multiple signature properties of each of multiple signatures documented over a time range of the common user, wherein a weight assigned to each the set of multiple signature properties or a portion thereof is calculated based on a combination of common user specific coefficients and multi-user coefficients, the weight is used for the generation of the classifier; and providing the authentication result.

Optionally, the combination of common user specific coefficients and multi-user coefficients comprises is based on uniqueness of certain signature properties of the common user relative to other multiple users.

Optionally, the combination of common user specific coefficients and multi-user coefficients comprises is based on a selected prioritization of signature properties for the common user relative to other multiple users.

Optionally, the combination of common user specific coefficients and multi-user coefficients comprises is based on differences of signature properties between the common user and multiple users. Optionally, differences of signature properties comprise signature properties of the common user that are dynamic and/or unique over time.

Optionally, the method further comprises re-training the signature authentication classifier based on received signatures from different common users and the related classification results.

According to an aspect of some embodiments of the present invention there is provided a method for authenticating signatures hand-drawn and digitally recorded using an electronic input element, comprising: receiving from a common user, at a client terminal, a signature for authentication, the signature being hand-drawn and digitally recorded using an electronic input element; transmitting the signature or plurality of signature properties of the signature to a central server; authenticating the received signature of the common user, at the central server, by applying a signature authentication classifier generated based on a set of multiple signature properties of each of multiple signatures documented over a time range of the common user, wherein a weight assigned to each the set of multiple signature properties or a portion thereof is calculated based on a combination of static features and dynamic features, the features extracted from the set of plurality of signature properties of each of the plurality of signatures documented over the time range, the weight is used for the generation of the classifier; and providing the authentication result.

Optionally, the static features comprise features that are substantially unchanged over time between the documented signatures over the time range, and the dynamic features comprise features that vary between the documented signature samples over the time range.

Optionally, the dynamic features are extracted from a recent time range, and the static features are extracted from a relatively longer time range than the dynamic feature time range. Optionally, authenticating further comprises calculating a user volatility factor based on the dynamic and/or static extracted features, the volatility factor denoting the accuracy of similarity between time spaced signatures of the common user and the received signature, and verifying that dynamic and/or static features extracted from the received signature are within a respective dynamic and/or static tolerance level based on the calculated user volatility factor.

Optionally, the static features are based on the shape of the signatures and/or general formation pattern of the signatures.

Optionally, the dynamic features are based on at least one member of a group consisting of: duration of formation, time related to the signature formation, speed, acceleration, pressure, tilt of the pointer relative to the signing plane, correlations between parameters, correlations of time and/or duration of various conditions, correlations of various properties of top and/or bottom part of the signatures, correlations of pressure at various conditions, correlations of tilt at various conditions.

Optionally, the dynamic features include at least one member of a group consisting of: Total duration, Write duration, Duration between first and second stroke, Duration of longest stroke, Time of start of second stroke, Number of points, Average speed, Maximum speed, Standard deviation of speed, Average horizontal speed, Maximum horizontal speed, Minimum horizontal speed, Standard deviation of horizontal speed, Average vertical speed, Maximum vertical speed, Minimum vertical speed, Standard deviation of vertical speed, Average acceleration, Maximum acceleration, Standard deviation of acceleration, Average pressure, Maximum pressure, Standard deviation of pressure, Average tilt, Maximum tilt, Standard deviation of tilt, Time of maximum x, Time of minimum x, Time of maximum speed, Time of minimum speed, Time of maximum horizontal speed, Time of minimum horizontal speed, Time of maximum vertical speed, Time of minimum vertical speed, Time of maximum acceleration, Duration of going up, Duration of going down, Duration of going right, Duration of going left, Total time of top quarter, Total time of bottom quarter, Average speed of top quarter, Average speed of bottom quarter, Average acceleration of top quarter, Average acceleration of bottom quarter, Pressure at point of maximum speed, Pressure at point of minimum speed, Pressure at point of maximum acceleration, Pressure at point of maximum curvature, Average pressure of going up, Average pressure of going down, Average pressure of going left, Average pressure of going right, Tilt at point of maximum speed, Tilt at point of minimum speed, Tilt at point of maximum acceleration, Tilt at point of maximum curvature, Average pressure of going up, Average pressure of going down, Average pressure of going left, Average pressure of going right, Tilt at point of maximum x, Tilt at point of minimum x, Tilt at point of maximum y, Tilt at point of minimum y.

Optionally, the dynamic features include at least one member of a group consisting of: Number of stokes, Start direction, End direction, Average direction of the longest stroke, Start direction of second stroke, Direction from start of first stroke to start of second stroke, Direction from end of first stroke to start of second stroke, Medium direction, Direction from start to end, Direction from start to center, Direction from end to center, Area, Aspect ratio, Length, Length/Area ratio, Difference of x of start to minimum, Difference of x of start to maximum, Difference of y of start to minimum, Difference of y of start to maximum, Difference of x of end to minimum, Difference of x of end to maximum, Difference of y of end to minimum, Difference of y of end to maximum, Number of change in x direction, Number of change in y direction, Standard deviation of x, Standard deviation of y.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
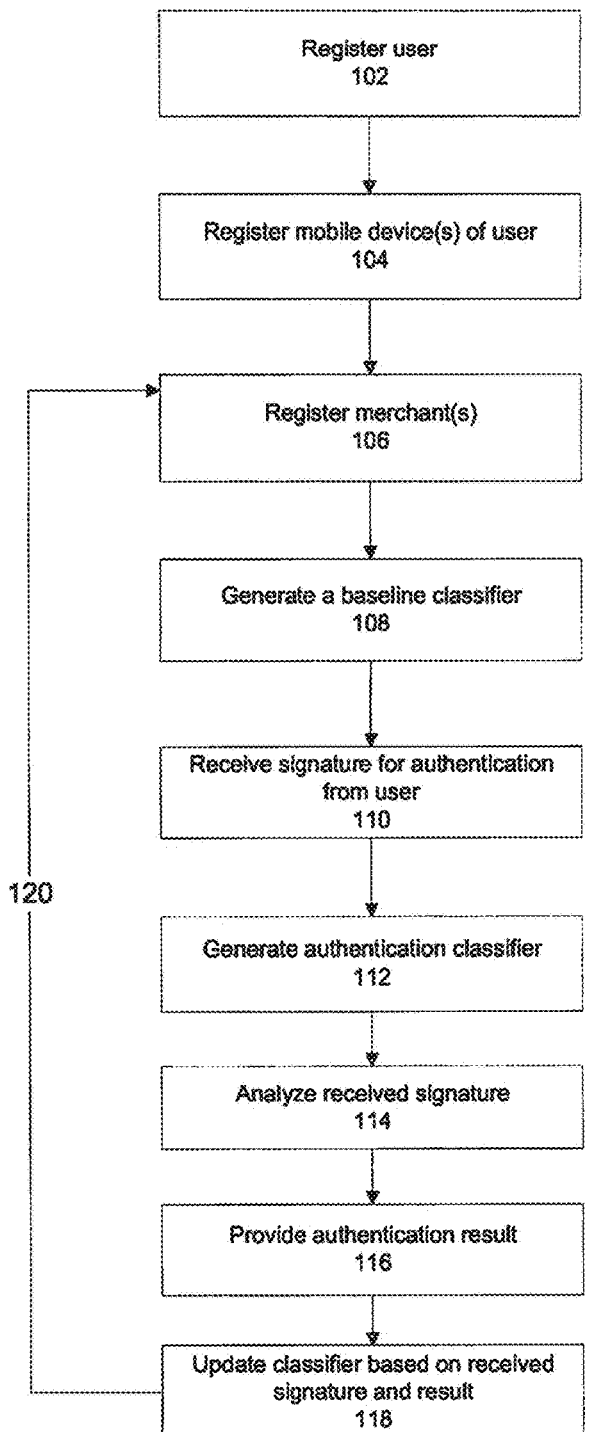
FIG. 1 is a flowchart of a method of authenticating a signature, in accordance with some embodiments of the present invention.

An aspect of some embodiments of the present invention relates to systems and/or methods for authenticating a signature of a user based on previous signature samples of the user, where more recent signature samples are assigned greater importance in determining authenticity. The signature is manually created, for example, hand drawn. The generated signature is digitally recorded using an electronic input element, for example, using a stylet (or finger) to sign on a touch screen or touch pad of a mobile device such as a Smartphone, or for example, an accelerometer of a smartwatch on the hand of the signing person, an imager that captures an image of the signature (e.g., after the signature has been written, such as on paper), or other methods of digitally capturing signature data. The authentication process adjusts to time related variations in the signature, for example, variations due to age, change in cognitive function (e.g., dementia), change in motor ability, change in neurological status (e.g., tremor), effects of arthritis, or other time related factors affecting the user. Some of the time related factors may have slow onset, and may slowly change the signature pattern. The authentication system and/or method may adjust accordingly and be able to authenticate the changing signature.

Optionally, the authentication is performed by comparing non-visual features between the received signature sample for authentication, and stored signature samples used as the basis for authentication. As defined herein, the term non-visual feature means a feature (or related to the feature, e.g., mathematical representation) that may not be extracted exclusively from a visual representation of the signature. For example, non-extractable from an image of the signature. The non-visual features may include features that are different when the signature for authentication is visually indistinguishable to the stored signatures. The non-visual features may include features that distinguish between two visually identical signatures. The non-visual features may include features related to muscle memory and/or intuitive movement, for example, features related to motions and/or gestures of the hand during signing. Examples of non-visual features include: time duration of maximum speed (e.g., of the stylet or finger when signing), time duration of the first stroke, time duration of the whole signature, action of pointer (e.g., movement direction such as up, down, forward, reverse), pressure applied by the pointer to a screen, orientation of the pointer relative to the screen, and/or other non-visual features, such as time related, pressure related, orientation related. The non-visual features may be difficult to forge, as a direct visual copy of the signature may have very different non-visual features. The non-visual features may be difficult for a potential forger to identify. Even if the non-visual features may be known, the potential forger may have difficulty replicating them, for example, as the non-visual features may relate to the specific muscle and/or joint status of the user.

As used herein, the term classifier may refer to a software module for determining the authenticity of a signature, for example, by assigning a result of authentic or not authentic, authenticated or rejected, yes or no, or other results. The classifier may sometimes refer to a software module for generating values for use by another software module for determining the authenticity of the signature. The classifier may calculate values based on signature properties of the signature samples, for example, input parameters associated with the signature samples, features extracted from signature samples, coefficient weights for the extracted features, mean and/or standard deviation values, variance values, and/or other values as described herein such as a user volatility factor (as will be described below). Sometimes the classifier refers to the calculated values, in addition to, or instead of, the authentication function. The classifier may be generated by methods described herein, or by other suitable machine learning modules. The classifier may be based on supervised learning or unsupervised learning. Examples of classifiers include, for example, artificial neural network, hierarchical clustering, collaborative filtering, content based filtering, a predictive model, data mining techniques, or other methods.

Optionally, the signature authenticating classifier is generated for authenticating additional signatures of a common user, based on a set of multiple signature properties of each of multiple signatures documented over a time range of a common user. Each set of signature properties is associated with a time period during which a respective signature was documented at the time range. The signatures were handdrawn and digitally recorded using the electronic input element. Optionally, a weight assigned to each set of signature properties or a portion thereof decreases overtime. The weight is used for generation of the classifier. The weight may decrease over time, for example, linearly, exponentially, logarithmically, suddenly (e.g., cut-off) or using other functions. The weight may be a threshold cut-off, so that signature properties before the threshold are assigned a weight of zero (i.e., removed) and signature properties after the threshold are assigned a weight of one (i.e., retained). The threshold may be a date and/or time period, a number of signatures (e.g., 10 most recent signature), combinations thereof and/or other thresholds.

Optionally, the authentication is performed by a classifier based on stored signature samples, the classifier being trained in multiple stages. The classifier may be trained by a first stage to establish a baseline. The first stage may be performed off-line, being time consuming and/or resource intensive. The entire (or most, or a significant part) set of signature samples of the user may be used to train the classifier in the first stage. Alternatively or additionally, signature samples of other users may be used to train the classifier in the first stage, for example, based on features that do not vary extensively between the users. In a second (or more than two) stage, the first classifier is adjusted to form a second classifier, and/or a second classifier is created based on the baseline values of the first classifier. The second classifier may be calculated during run-time, for example, immediately after receiving the signature sample from the user. The second classifier may be calculated quickly and/or with limited resources. Calculation of the second classifier may involve a limited selected number of signature samples of the user requesting authentication, for example, 5, 10, 20, or other number of samples. Optionally, the samples are more recent in time relative to the rest of the samples. Alternatively, the classifier is generated in a single phase.

Optionally, the first classifier is generated based on static characteristics of features extracted from the stored signatures recorded over the time range. The static characteristics may include features that are substantially unchanged (e.g., within a predefined range and/or threshold) over time between the stored signatures, for example, the x-y pattern of how the signature is formed, the size of the signature, or other patterns that remain static. Optionally, the second classifier is generated based on varying and/or dynamic characteristics of features extracted from the subset of stored signatures having more recent time periods. The varying characteristics may include features that vary (e.g., based on a predefined range and/or threshold) between signature samples (optionally the more recent samples), for example, the time taken to perform the signature, the pressure applied, tremor (e.g., wavy lines instead of straight), or other patterns that may change over time. The varying characteristics may be independent of the static characteristics (e.g., different extracted features), and/or may be related to the static characteristics (e.g., describing variations relative to the static baseline).

The multiple stage classification formation may maintain the classification in an updated state, adjusting to changes in user signature formation. A new and/or updated classifier may be generated on-the-fly, and/or on an add-needed basis, in response to authentication requests.

Optionally, the processed signature and related authentication result (e.g., authenticated or rejected) is used to update the classifier. The update may be performed by selecting the processed signature within the set of signature samples for creating the second classifier. A sliding window of a preselected size of signature samples may be used to select the most recent signature samples. The run-time classifier may be updated, or a new classifier may be formed based on the new set of recent signature samples.

Optionally, the first classifier is generated at least partly based on features extracted from signature samples of different users. The second classifier may be generated based on the first classifier, to reflect how features specific to the user requesting authentication are related to the features extracted from the signatures of the different users. The authentication may be based on differences in extracted signature features between the user and a general population of users.

Optionally, authentication is based on comparing the signature for authentication against previous signatures from the (supposedly) same user. A user volatility factor may be calculated, for example, for each extracted feature. The volatility factor may denote the ability of the user to accurately repeat signature patterns. Volatility factors may be calculated for each different extracted feature, input parameter and/or feature coefficient. The volatility factor may denote the relative level of repeatability in accuracy of different dimensions of signing, such as space, time pressure, or other variables. Volatility factors may be calculated for a set of features, parameters and/or coefficients. A single volatility factor may be calculated for all features, parameters and/or coefficients. For example, a low volatility factor may denote highly accurate repeated signature patterns. The volatility factor may be calculated based on authenticated stored signatures. Features extracted from the signature for authentication may be compared against the volatility factor of the signature samples, to determine if the signature for authentication falls within allowable tolerance limits of variation. Users that are able to generate accurately repeatable signatures may enjoy a higher level of authentication, and/or fewer errors in authentication. Forgers may have greater difficulty forging signatures within the tighter tolerance levels of users with repeatable signatures.

An aspect of some embodiments of the present invention relates to systems and/or methods for authentication of hand written and/or manually created signatures, based on historical manual signatures recorded at multiple electronic input devices which are distributed along multiple geographically remote merchants. Optionally, the authentication is performed by a central server, which receives the signature sample of a user, authenticates the signature sample, and provides the authentication response. The central server may provide a service for different merchants (e.g., having different locations, different owners, part of different markets or other variations) to authenticate clients based on hand drawn signature samples. The service may be quick and/or easy to use, for both clients and merchants. The signature authentication methods and/or systems may provide a safe, reliable and/or easy way for businesses to identify users and/or customers.

An aspect of some embodiments of the present invention relates to methods and/or systems for authenticating a signature of a common user based on a combination of common user specific coefficients and multi-user coefficients, where a weight based on the combination is used to generate a classifier for authenticating the signature. The combination is calculated from previously documents signature samples from the common users.

Optionally, signatures are received from different common users at a client terminal. The signatures (or signature properties corresponding to the signature, or features extracted thereof) are transmitted to a central server for authentication of the common user based on the signature. The authentication result is provided, optionally by being transmitted back to the client terminal.

Optionally, the combination of common user specific coefficients and multi-user coefficients comprises is based on uniqueness of certain signature properties of the common user relative to other multiple users. Alternatively or additionally, the combination is based on a selected prioritization of signature properties for the common user relative to other multiple users. Alternatively or additionally, the combination is based on differences of signature properties between the common user and multiple users. The differences in signature properties may be based on dynamic and/or unique aspects of the signature properties over time. Additional details are provided below, for example, with reference to FIG. 6.

The generated signature authentication classifier may be updated (e.g., occasionally, periodically) with the new and/or additional received signatures from the different common users using the related classification results. The updated classifier may adapt to changes in signing patterns of the users over time.

An aspect of some embodiments of the present invention relates to methods and/or systems for authenticating a signature of a common user based on a combination of static and dynamic features extracted from the set of plurality of signature properties of each of the plurality of signatures documented over the time range, where a weight based on the combination is used to generate a classifier for authenticating the signature. The combination is calculated from previously documents signature samples from the common users.

Optionally, the static and dynamic features are separately analyzed. Optionally, user volatility factors are separately calculated for the static and dynamic features. Optionally, the user volatility factors are separately analyzed for the static and dynamic features, such as based on respective static and dynamic thresholds. The static threshold level may have a lower expected variance than the variance for the dynamic threshold level. Over the time period of the stored signatures, static features may be expected to vary less than dynamic features.

Optionally, the static and dynamic features are analyzed based different historical time periods of the previously documented signature samples. The static features may be analyzed based on longer historical periods, such as the entire set of signature samples, or a longer period than the dynamic features. The dynamic features may be analyzed based on a more recent and/or shorter historical period.

Separately analyzing the static and dynamic features may provide for increased security and/or authentication capabilities. For example, successful authentication based on the static features, but a failure to authenticate based on the dynamic features may identify a forger. The forger may be able to replicate the static features, but unable to replicate the dynamic features. In a similar manner, unexpected changes to the static features may indicate an attempt at forgery. The dynamic features may provide the classifier with the ability to adjust over time to the user signing patterns. Time related changes to the static features may not be tolerated, for example, changes to the static features may require a re-registration of the user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
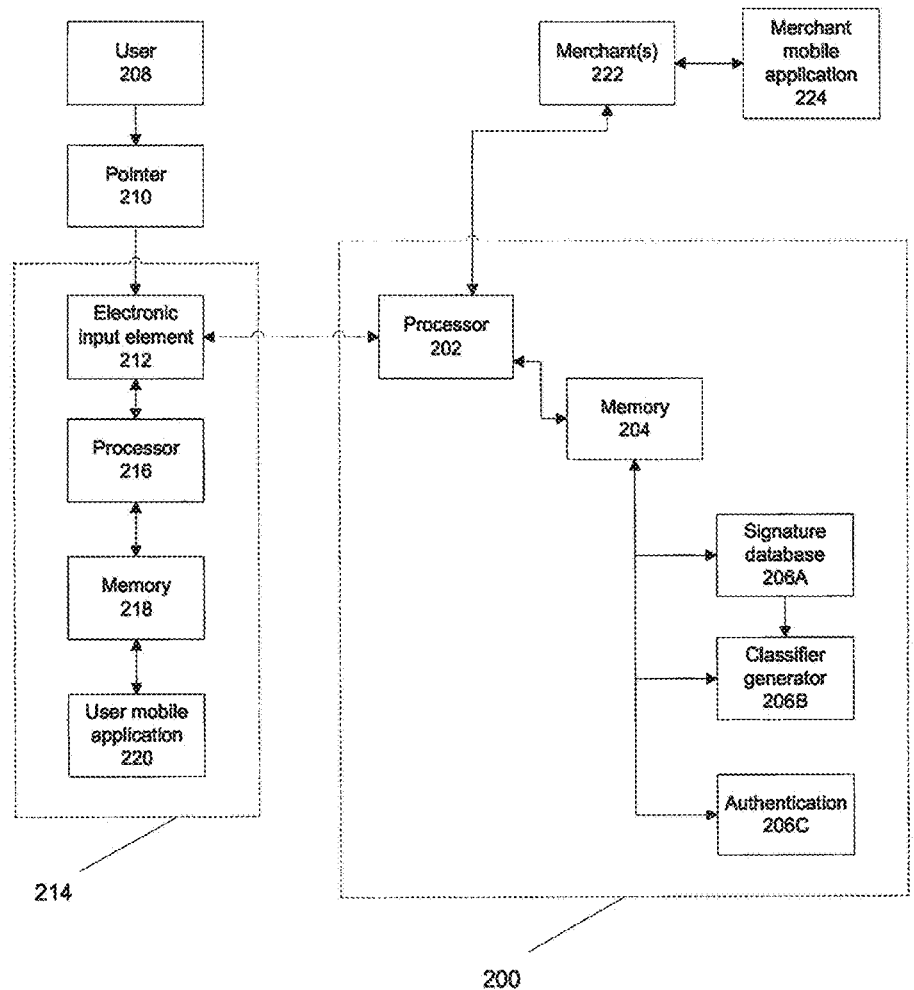
FIG. 2 is a block diagram of a system of authenticating a signature, in accordance with some embodiments of the present invention.

Reference is now made to FIG. 1, which is a flowchart of a method of authenticating a signature, in accordance with some embodiments of the present invention. Reference is also made to FIG. 2, which is a block diagram of a system 200 (e.g., signature authentication system) for authenticating a signature, in accordance with some embodiments of the present invention. The method of FIG. 1 may be performed by system 200 of FIG. 2. System 200 may be a signature authentication unit programmed to carry out the steps of the method of FIG. 1. The signature authentication methods and/or systems may provide a safe, reliable and/or easy way for businesses to identify users and/or customers.

System 200 and/or the method of FIG. 1 may provide increased security based on authenticating hand written signatures, which may be difficult to forge. System 200 and/or the method of FIG. 1 may learn and adjust to changes in the signature over time, for example, related to aging of the signing user. New signatures following the pattern of change over time may be authenticated, even if they are different than old signatures. System 200 and/or the method of FIG. 1 provides users with the ability to identify themselves (e.g., wirelessly) by signing on a device able to capture touch information, for example, a mobile device such as a Smartphone with a touchscreen and/or touch pad. System 200 and/or the method of FIG. 1 may provide corporate and/or retail clients with the identity authentication feature to authenticate the identity of their customers (e.g., users). Authentication may be performed in real-time.

Optionally, system 200 is implemented as a central server, such as a proxy server, that communicates with multiple geographically remote terminals, such as merchant client terminals (e.g., 222) and/or user client terminals (e.g., 214).

The user client terminals may be part of the merchant client terminal, or independent of the merchant client terminal.

Optionally, the central server includes a network interface for communicating with the remote client terminals. Communication between the central server and client terminals may occur, for example, through a network, such as the internet, a private network, a wireless network, or other networks. The central server may be hosted by a computing cloud. The network interface may receive the signature (or data derived from the signature) for authentication and/or provide the authentication result. An exemplary implementation of the central server is described below, for example, with reference to FIG. 3.

System 200 comprises one or more hardware processors 202 in electrical communication with one or more non-transitory memories 204 storing one or more program modules and/or databases containing instructions for execution by processor 202.

Optionally, a signature database 206A stores signatures recorded over a time and/or date range, for example, from user registration to the most recently obtained signature. Each signature may be associated with a time and/or date period during the time range (e.g., time and/or date stamp). The signature database may store signatures for registered users. Signatures may be associated with specific users.

Signature database 206A may store multiple historically documented manual signatures for each user requiring authentication. As described below, the system may update itself with each signature provided by the user. Such new and/or additional signatures may have been obtained through different electronic input elements, for example, at different geographical merchant locations.

Optionally, a classifier generation module 206B generates a classifier for authenticating signatures based on the stored signatures within database 206A. Stored signatures with more recent time periods may be assigned greater weight for classification than stored signatures with less recent time periods.

Optionally, an authentication module 206C authenticates a signature received from a user, by applying the generated classifier to the received signature.

An electronic input element 212 is in electrical communication with processor 202. User 208 may use a pointer 210 (e.g., stylus, finger, other device) to sign on electronic input element 212 (e.g., touchscreen, touchpad) to generate an electronic signal indicative of the hand written signature. User 208 may be a customer or other individual that wants to be able to authenticate him/herself using his/her hand written signature.

Electronic input element 212 may be part of a device and/or client terminal, for example, a stationary device such as an independent touch screen module (e.g., standalone), computer or other stationary device, or a mobile device 214 such as a Smartphone, a laptop computer, a Tablet, or other mobile devices and/or client terminals. Mobile device 214 contains a processor 216 and memory 218 storing program modules, databases and/or other instructions for execution by processor 216.

Optionally, memory 218 stores a user mobile application 220 for providing authentication related functionality, for example, initial user registration, signature sample request, mobile device registration and management, user profile management, merchant specific user profile data management (e.g., e-wallet data, customer identification, and/or other functions), and/or other functions related to system 200.

Mobile applications may be provided to users (application 220) and/or merchants (application 224). Different mobile device platforms may be supported, for example, different Smartphone operating systems.

Merchant 222 may have merchant mobile application 224 installed on a merchant client terminal or other suitable system, for example, a server providing services to mobile devices, mobile devices of the merchant, or other systems. Merchant mobile application 224 may provide one or more authentication related functions to merchants: managing the merchant account, registering new merchant systems or interfacing with authentication system 200, configure remote authentication triggering (depending on the mobile device, for example, WiFi, BT, near field communication (NFC), or others), receiving a user ID for identification from mobile device 214 of the user running user mobile application 220.

System 200 may be sold as a software module and/or as hardware (e.g., box, or card). System 200 may be installed within a cloud environment, a private network, the internet, a wireless network, and/or may be installed on a computer without a network connection. The cloud environment installation may provide service endpoints for both merchant and user services, and/or scaling, load balancing and/or high availability. Cloud endpoint modules may provide mobile and/or internet communication for users and/or merchants with system 200.

Authentication results may be provided to a merchant 222, for example, to a website of an online seller, to an employee in a retail store, or other electronic and/or human requesting authentication of user 208.

Optionally, at 102 a user is registered for authentication services. For example, user 208 registers with system 200. Registration may be performed through mobile application 220.

Optionally, user 208 provides several signature samples, for example, 5, 10, 20, or other suitable number of samples. The initial set of signature samples are used to initially train a classifier for authentication future signatures.

Registration may be directly performed between mobile application 220 and system 200. Merchants 222 may not facilitate the registration process with user 208.

During the registration process, the user identify and/or mobile device identify may be verified. Details of an exemplary user identification process are described below.

The registered user may enable selected merchants to perform signature authentication of the registered user. The enabled merchants may send ID authentication requests to the mobile device of the user, to identify the user in real time (e.g., within several seconds or several minutes of requesting the authentication), for example, by sending push notifications to the mobile device requesting the signature for authentication.

Optionally, at 104, user 208 registers other mobile devices 214 with system 200. Several mobile devices 214 may be registered under the same user.

Registration may proceed by downloading mobile application 220 to mobile device 214.

Device registration may occur by a device registration process. Details of an exemplary device registration process are described below.

Upon completion of the user registration (block 102) and/or device registration (block 104), registered merchants may send requests for signatures to the registered devices of the registered user.

Optionally, at 106, a merchant is registered with system 200, such as merchant 222. An exemplary merchant registration process is described in detail below.

Optionally, at 108, a baseline classifier is generated, for example, by classifier generator module 206B. The baseline classifier may serve as a basis for generating an authentication classifier used to authenticate a signature from a user.

Optionally, the baseline classifier is generated based on the complete set (or most of the set, or selected samples) of signatures for the user requesting authentication. The set of signatures may be stored in signature database 206A. Each signature may contain an associated authentication result, for example, authenticated or not authenticated. The signatures may have been obtained at different points in time, for example, over years, months, days and/or hours. The signatures along with results may be used to train the classifier, and/or generate metrics to be used for classification. Alternatively or additionally, the baseline classifier is generated based on the complete set (or most of, or selected samples of) of signatures from all other users (or most of, or selected users).

Optionally, the baseline classifier includes calculated adjustment factors. The adjustment factors may be based on the extracted features. The adjustment factors may not necessarily provide the ability to authenticate signatures by themselves. The adjustment factors may be used to adjust a different classifier (or the baseline classifier) to perform the authentication. The adjustment factors may reflect user specific characteristics, for example, with respect to the other users. The adjustment factors may be used as a baseline, and adjusted to account for change in more time recent signature samples.

Generating the baseline classifier may involve complicated computations, which may require large available memory space and/or significant processor resources. The baseline classifier may be generated off-line and/or by a suitable computer, for example, a server operating overnight. The baseline classifier may be occasionally re-generated, for example, based on available resources, based on changes in the signatures, at predefined time internals, or other factors.

Optionally, the baseline classifier is generated by obtaining input parameters from the stored signatures. The input parameters may be a set of raw mathematical values which are captured during the signing process. Alternatively or additionally, the baseline classifier is generated by extracting features from the stored signatures. The features may be a set of mathematical values that describe abstract features of the signing sample. The features may be calculated (entirely or in part) from the input parameters, or may be directed obtained from the stored signature samples. The features may relate to statistically repeating patterns in the signing process. The features may have associated feature coefficients. Alternatively or additionally, the baseline classifier is generated by calculating feature coefficients for the extracted features. The baseline classifier may include the feature coefficients, or may consist of only the calculated feature coefficients. The feature coefficients may be feature specific weight values that represent the relative importance of respective features.

Optionally, the feature coefficients denote user specific adjustments to the generic behavior of each feature calculated based on multiple users. For example, the user may vary the speed and/or dimension of the signature more than other users. Alternatively or additionally, the feature coefficients denote deviation patterns of the user for different features and/or behavioral relationships between features, specifically for the user and/or for multiple users.

The feature coefficients may be calculated and/or calibrated based on multi-user statistical patterns (obtained from signature samples of the users) and/or based on user specific calibration based on historical patterns of the specific user. Optionally, a first set of feature specific weight coefficients are determined based on statistical patterns of stored signatures from different users, and a second different set of feature specific weight coefficients are determined based on user specific historical patterns. In this manner two sets may be created, one as a general check for features common with other users, and another as a specific check for features unique to the user. Alternatively or additionally, the feature specific weight coefficients are determined based on statistical patterns of stored signatures from different users. The set of feature specific weight coefficients is then adapted to the specific user based on user specific historical patterns. In this manner, the feature specific weight coefficients may reflect how the user signs differently as compared to other users. Alternatively, feature coefficients may be determined only for the user, without data from other users.

The feature coefficients may be calibrated and/or calculated, for example, using statistical pattern scanning and relationship scanning techniques, periodically executed on the history of stored signature samples from different users.

Examples of input parameters include: time (i.e., time to perform various actions), action direction (i.e., of the pointer, such as down (to touch), up (leaving), or move), position (i.e., x/y coordinate values of the event, based on the size and/or resolution of the touch screen), pressure (i.e., pressure the pointer applies to the screen), size (i.e., of the pointer touching the screen), orientation (i.e., orientation of the pointer in relation to the screen), tool major/minor (i.e., the length of the major and/or minor axes of an ellipse that denotes the size of the approaching tool), touch major/minor (i.e., the length of the major and/or minor axes of an ellipse that describes the touch area at the point of contact), or other input parameters.

Features may relate to speed, position, orientation, scaling, pressure, direction, or other variables. Examples of features include: duration of maximum speed, duration of first stroke, duration of the whole signature, standard deviation of x, standard deviation of y, average pointer size, average pointer size on x and/or y direction (positive/negative), or other features.

Static features may be related to the shape of the signatures, general formation pattern of signature, or other static feature. Exemplary static features include one or more of: Number of stokes, Start direction, End direction, Average direction of the longest stroke, Start direction of second stroke, Direction from start of first stroke to start of second stroke, Direction from end of first stroke to start of second stroke, Medium direction, Direction from start to end, Direction from start to center, Direction from end to center, Area, Aspect ratio, Length, Length/Area ratio, Difference of x of start to minimum, Difference of x of start to maximum, Difference of y of start to minimum, Difference of y of start to maximum, Difference of x of end to minimum, Difference of x of end to maximum, Difference of y of end to minimum, Difference of y of end to maximum, Number of change in x direction, Number of change in y direction, Standard deviation of x, Standard deviation of y.

Dynamic features may be related to duration of formation, time related to the signature formation, speed, acceleration, pressure, tilt (e.g., of the pointer relative to the signing plane), correlations between parameters, such as correlations of time and/or duration of various conditions, correlations of various properties of top and/or bottom part of a signature, correlations of pressure at various conditions, correlations of tilt at various conditions, and/or other correlations and/or other dynamic features.

Exemplary dynamic features related to time and/or duration include one or more of: Total duration, Write duration, Duration between first and second stroke, Duration of longest stroke, Time of start of second stroke, Number of points.

Exemplary dynamic features related to speed include one or more of: Average speed, Maximum speed, Standard deviation of speed, Average horizontal speed, Maximum horizontal speed, Minimum horizontal speed, Standard deviation of horizontal speed, Average vertical speed, Maximum vertical speed, Minimum vertical speed, Standard deviation of vertical speed.

Exemplary dynamic features related to acceleration include one or more of: Average acceleration, Maximum acceleration, Standard deviation of acceleration.

Exemplary dynamic features related to pressure include one or more of: Average pressure, Maximum pressure, Standard deviation of pressure.

Exemplary dynamic features related to tilt include one or more of: Average tilt, Maximum tilt, Standard deviation of tilt.

Exemplary dynamic features related to correlation of time and/or duration with various conditions include one or more of: Time of maximum x, Time of minimum x, Time of maximum speed, Time of minimum speed, Time of maximum horizontal speed, Time of minimum horizontal speed, Time of maximum vertical speed, Time of minimum vertical speed, Time of maximum acceleration, Duration of going up, Duration of going down, Duration of going right, Duration of going left.

Exemplary dynamic features related to correlation of various properties of the top and/or bottom of the signature include one or more of: Total time of top quarter, Total time of bottom quarter, Average speed of top quarter, Average speed of bottom quarter, Average acceleration of top quarter, Average acceleration of bottom quarter.

Exemplary dynamic features related to correlation of pressure with various conditions include one or more of: Pressure at point of maximum speed, Pressure at point of minimum speed, Pressure at point of maximum acceleration, Pressure at point of maximum curvature, Average pressure of going up, Average pressure of going down, Average pressure of going left, Average pressure of going right.

Exemplary dynamic features related to correlation of tilt with various conditions include one or more of: Tilt at point of maximum speed, Tilt at point of minimum speed, Tilt at point of maximum acceleration, Tilt at point of maximum curvature, Average pressure of going up, Average pressure of going down, Average pressure of going left, Average pressure of going right, Tilt at point of maximum x, Tilt at point of minimum x, Tilt at point of maximum y, Tilt at point of minimum y.

Sub-sets (or all) of the above mentioned (or other) features may be extracted.

The set of extracted features may be selected to be specific to each user. Different users may have different combinations of extracted features.

The features may be select so that the ability to forge the signature of a user without the prior knowledge of the different extracted features is close to zero.

Optionally, the baseline classifier includes a calculation of the user volatility factor based on the stored signature sample set. The volatility factor may be calculated based on the input parameters, features and/or feature coefficients.

At 110, a signature for authentication is received, for example, from user 208 signing on electronic input element 212 using pointer 210.

At 112, an authentication classifier is generated, for example, by classifier generator module 206B. The authentication classifier may be a newly generated classifier based on the baseline classifier (of block 108) and/or a modification of the baseline classifier.

The authentication classifier is specific to the user requesting authentication.

Optionally, the authentication classifier is generated based the stored signatures (e.g., signature database 206A), where stored signatures with more recent time periods are assigned greater weight for authentication by classification than stored signatures with less recent time periods. Optionally, a preselected number of the most recent signatures are obtained, for example, using a sliding window of predetermined size. Alternatively or additionally, the most recent signatures are obtained using a cutoff date. Alternatively or additionally, all (or most) of the signatures are obtained, with increasing weights assigned to more recent signatures, for example, weights may be assigned by a linear function, an exponential function, or other methods. Use of the recent signatures may generate authentication classifiers that adapt to changes over time.

The most recent signatures may be used to generate the authentication classifier by training the authentication classifier using features extracted from the most recent signatures. Optionally, the extracted features (or related measures such as weights) are calibrated and/or adjusted based on the calculated adjustment factors and/or baseline classifier (e.g., as in block 108). Alternatively or additionally, the adjustment factors and/or baseline classifier are used as a baseline that is modified based on the features extracted from the most recent signatures.

The authentication classifier may be trained and/or generated based on input parameters, extracted features, and/or feature coefficients from the most recent signatures.

The generated authentication classifier may adapt to time related changes of the stored signatures. The generated authentication classifier may be based on a learning mechanism that may help ensure that the classifier is able to determine future identity authentication requests with increasing accuracy.

Generating the authentication classifier may be relatively quick, and/or may not require significant memory and/or processor resources. The authentication classifier may be generated in real time and/or during run time, for example, the generation is triggered upon receiving a request for authentication (e.g., from the merchant) and/or upon receiving the signature sample for authentication (e.g., from the user). Generating the authentication classifier on an as needed basis may provide a classifier based on the most up to date signature patterns, which may provide for adaptation of recent signature pattern changes. Generation on an as needed basis may conserve resources, as only those classifiers that are needed at the moment are calculated, instead of calculating classifiers for all registered users. Alternatively, the authentication classifier may be generated in advance and stored until needed.

The baseline classifier and the authentication classifier may be a single classifier, for example, generated in two or more phases, or in a single phase.

The generated authentication classifier may be provided for authenticating the signature from the user.

Optionally, the classifier is generated to authenticate the user signature with a predefined false positive rate and/or false negative rate. Optionally, the predefined false positive rate is dynamic, decreasing over time with increasing numbers of consistent user signatures. The classifier established from the very similar signatures may authenticate other very similar signatures, and reject signatures that vary slightly. In this manner, users who can repeat signature patterns with a high level of similarity may be more difficult to forge. The learning feature aspect of the method and/or system may favor users who can sign consistently, by reducing the false positive rate so that signatures that are borderline in quality are rejected.

In order for the classifier to mistakenly authorize an identification request (i.e., a forgery), the potential forger may need to generate a time series of X size, containing a set of N parameters, which will be derived into M features, in such a way so that all features result in a variance range V derived from the generated classifier (i.e., based on stored signature).

Optionally, the authentication classifier includes a calculation of the user volatility factor based on the recent signature sample set. The volatility factor may be calculated based on the input parameters, features and/or feature coefficients.

The following is an exemplary algorithm for generating an exemplary authentication classifier:

1. Fetch a window of N previously recorded signature samples (e.g., from signature database 206A).
2. For each of the fetched signature samples, extract features.
3. Fetch calculated feature specific coefficients (e.g., from signature database 206A) related to the extracted features (e.g., calculated in block 108). The coefficients may be specific to the user requesting signature authentication. The coefficients are calculated and/or calibrated periodically based on user specific and/or multi-user historical data patterns, optionally in a parallel calibration process, as described in block 108.
4. Weigh each extracted feature using the calibrated coefficient.
5. Calculate mean and/or standard deviation from the weighted features.
6. Calculate a volatility factor for the user based on the general deviation of the features which were extracted from the signature sample window. Volatility factors may be calculated for each extracted feature, for a group of features, or one factor for all features.

The authentication classifier may comprise of the extracted features, the weighted features, the mean, the standard deviation and/or the volatility factor.

At 114, the received signature is analyzed for authentication, for example, by authentication module 206C. The received signal is analyzed by applying the generated authentication classifier, optionally to features extracted from the received signature and/or to the input parameters. Optionally, an authentication result is provided, for example, authenticated or rejected.

The following is an exemplary algorithm for applying the exemplary authentication classifier generated by the exemplary algorithm of block 112:

1. Extract features from the received signature for authentication.
2. Weigh each of the extracted features using the calculated feature specific coefficients (referred to as Feature).
3. Count the total number of extracted features that pass a variance check (referred to as a pass count). The variance check for each extracted feature may be defined by the relationship:

(Feature−Mean)<=(Stddv*Volatility)

4. The authentication (e.g., pass or fail) is determined based on the relationship:

(Pass Count)>=Threshold

Pass count denotes the total number of extracted features that passed the variance check. Feature denotes the values of the respective weighted extracted feature. Mean denotes the mean value of the respective feature for the stored signatures. Stddv denotes the standard deviation value of the respective feature for the stored signatures. Volatility denotes the volatility factor of the respective feature for the stored signatures. The Mean, Stddv, and/or Volatility may be obtained from the generated classifier, and/or calculated from values obtained from the classifier. Feature may be calculated in step 2. The values for Mean, Stddv and Volatility may be calculated in block 112 as part of the authentication classifier generation.

Threshold denotes the minimum number of features that need to pass in order to consider the signature authenticated (e.g., pass). The threshold value may be dynamic, changing for example based on signature complexity and/or user time progression. The threshold may be selected manually by an operator of the system and/or automatically determined by software. Optionally, threshold is selected based on the target false positive rate and/or false negative rate selected for performance of the authentication classifier.

Optionally, at 116 the authentication result is provided, for example, to merchant 222. The authentication result may be provided, for example, as an encrypted signal to a computer or server operated by the merchant, as a flashing light (e.g., red or green), as a message displayed on a screen, or other methods.

The merchant may use the authenticated signature to verify the identity of the user, for example, to proceed with a sales transaction.

Optionally, at 118 the received signature and authentication result (e.g., pass or fail) are stored, for example, in signature database 206A. Optionally, the classifier (baseline classifier of block 108 and/or authentication classifier of block 112) is updated based on the stored received signature and authentication result. The updates may adapt the classifier to changes in the signatures over time. The updates may be performed for the users of the system, to keep the signature database updated for the users. The updates for other users may be used when generating the classifier for the common user as described herein.

Updates may be performed, for example, after each authentication attempt, after each successful authentication, based on available processor resources, at predefined time intervals, or other methods.

Optionally, at 120, one or more blocks of the method are repeated.

Optionally, the signature sample (of block 110) is stored along with the authentication result (block 114), for example, in signature database 206A.

Optionally, a new classifier is generated, or the existing classifier is updated (block 108) based on the stored recent signature sample and authentication result. The classifier may be updated (or regenerated) after every signature authentication request, or after several requests, or a predefined time periods (e.g. weekly), or other methods.

Figure 5:
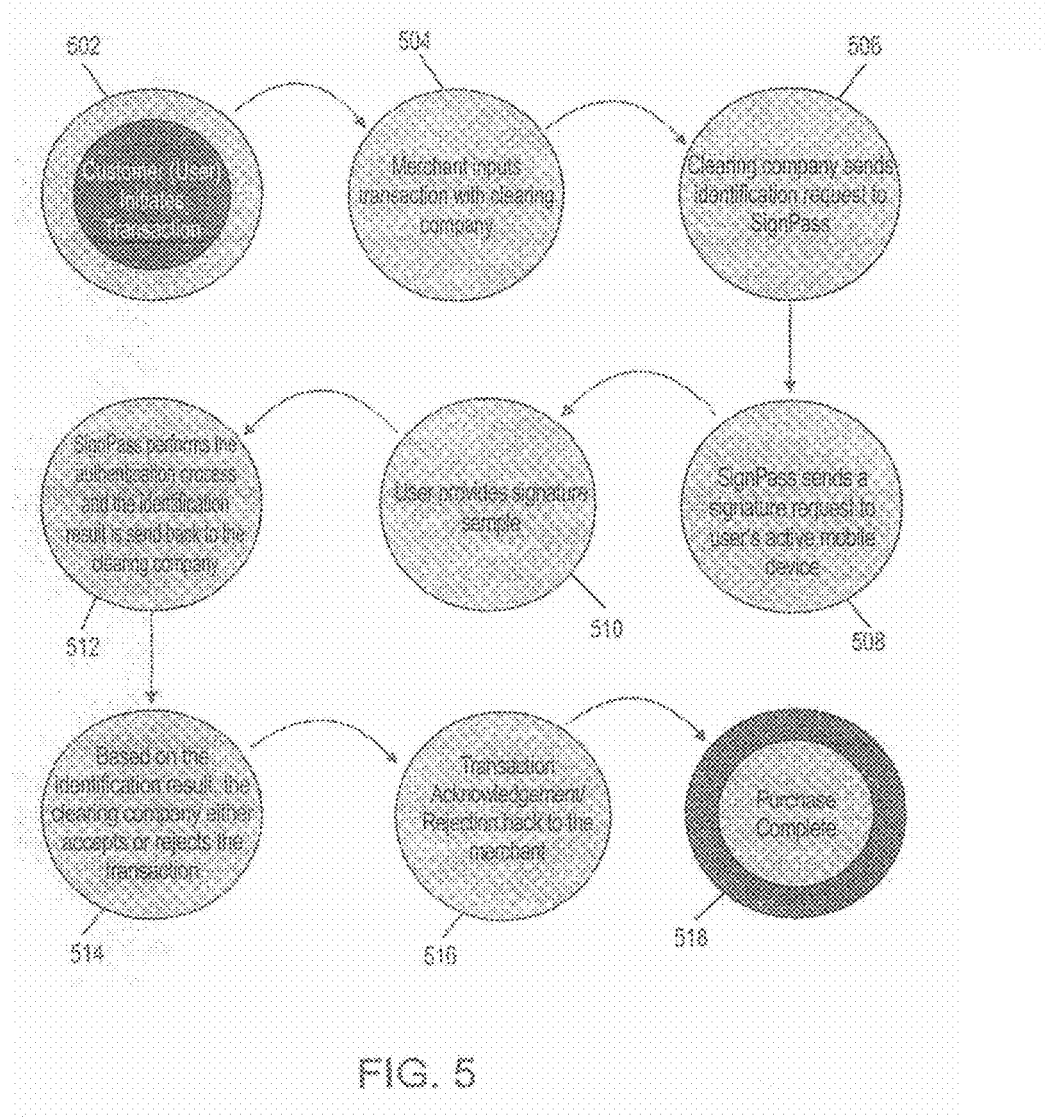
FIG. 5 is a flowchart of an exemplary method of authentication signatures of users performing financial transactions, in accordance with some embodiments of the present invention.
Figure 6:
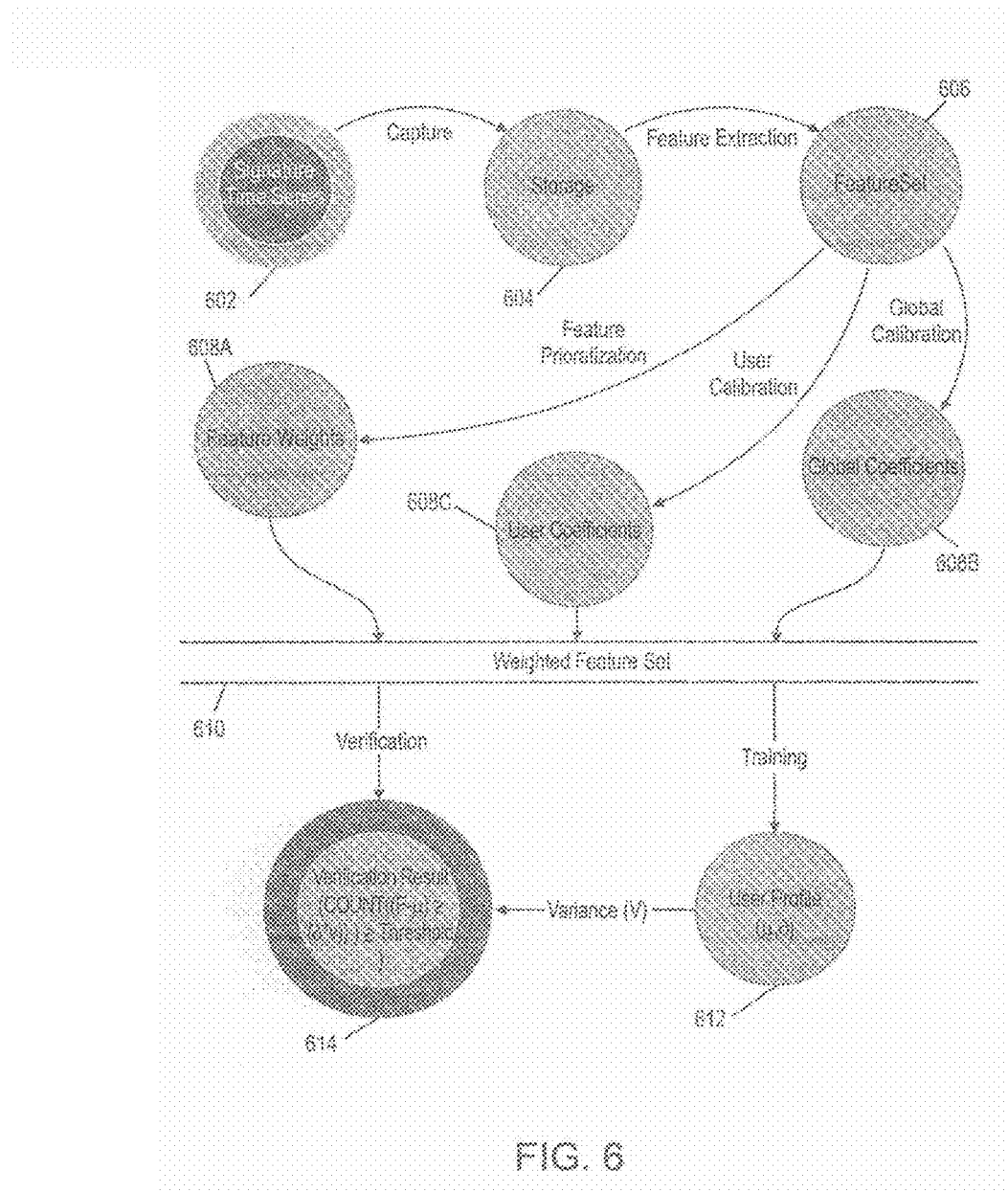
FIG. 6 is an exemplary method of generating a classifier for signature authentication, in accordance with some embodiments of the present invention.

Reference is now made to FIG. 6, which is an exemplary method of generating a classifier for authentication of signatures, in accordance with some embodiments of the present invention. Optionally, the method includes applying the generated classifier to authenticate a received user signatures. The method of FIG. 6 may be utilized by the method of FIG. 1, FIG. 4 and/or FIG. 5 to generate the classifier, and/or to apply the generated classifier to authenticate the signature. The method of FIG. 6 may be executed by the system of FIG. 2, and/or FIG. 3.

The method may generate a classifier that is resistant to signature forgeries, for example as two visually similar signatures may be correctly authenticated or rejected. The method may generate a classifier that adapts to time variations in signature formation, for example, as the signing user ages.

Optionally, the method generates a classifier in which signature samples (used to train the classifier) that are relatively more recent in time are assigned relatively higher weights for authentication relative to signature samples that are older. Alternatively or additionally, the method generates the classifier based on the uniqueness of features and/or feature weights of the requesting user relative to other users. Alternatively or additionally, the method generates the classifier based on changes in features over time. Alternatively or additionally, the method generates the classifier based on non-visual features, for example, features related to hand gestures during the signing process.

Optionally, at 602, multiple signature samples are captured from the receiving user, for example, generated by forming signing gestures on electronic input 212 of FIG. 2. The multiple signature samples may be captured as part of the user registration, to generate an initial classifier for authentication. Alternatively or additionally, the multiple signature samples may be captured over time, as the user generates signatures for different transactions. Signature samples may be collected from other users of the system.

Optionally, at 604, the signature samples are stored, for example, in database 206A.

At 606, features are extracted from the stored signature samples and/or from the signature properties of the stored signature samples, for example, by classifier generator module 206B. Extracted features may relate to non-visual features, such as features related to signing gestures, for example, pressure, speed, time or other non-visual features.

Optionally, at 608A, the features are assigned weights, for example, by module 206B. Optionally, the weights are assigned based on time. For example, features from older signature samples receive a lower weight than features from newer signature samples. Alternatively or additionally, the weights are assigned based on relative importance of features in authentication, such as relative ability to authenticate. Different features may be prioritized differently in different users, as some users may have features that are unique to them. For example, features related to speed may authenticate better than features related to pressure.

Alternatively or additionally, at 608B, features are assigned weights based on a global calibration, for example, by module 206B. Optionally, the global calibration is relative to other users, such as all other users, or a subset of other users. The weights may be assigned based on commonality of the features between the different users. For example, all (or most) users may tend to sign by applying pressure within a defined pressure range. Alternatively or additionally, the global calibration is relative to the same user, for example, features that stay relatively constant over time.

Alternatively or additionally, at 608C, features are assigned weights based on a unique and/or dynamic calibration, for example, by module 206B. Optionally, the weights may be assigned based on uniqueness of certain features to the requesting user relative to other users. For example, the requesting user may perform a gesture that nobody (or few) other users perform, for example, taking a pause for a time period in the middle of the signing. The weights may be assigned based on differences between the requesting user and other users. For example, the requesting user may cross their letter 't' very slowly compared to other users. Alternatively or additionally, the weights may be assigned based on features that are dynamic and/or unique over time, for example, the user recently changed the way in which they cross their letter t, but did not change the way in which they form the other letters.

Optionally, at 610, a weighted feature set is generated based on a combination of the weighted features calculated in blocks 608A, 608B and/or 608C.

At 612, a classifier is trained based on the weighted feature set of block 610, for example, by module 206B. The classifier may be generated in a single phase, or in multiple phases, as described herein. For example, a first baseline classifier (e.g., as described in block 108 of FIG. 1) and a second or more authentication classifier based on the baseline classifier (e.g., as described in block 112 of FIG. 1).

Optionally, the mean and/or standard deviation of each of the weighted features are calculated. Alternatively or additionally, the mean and/or standard deviation are calculated for a group of features (e.g., related features) and/or for all features.

Optionally, the volatility factor is calculated for each of the weighted features. Alternatively or additionally, the volatility factor is calculated for a group of features (e.g., related features) and/or for all features.

At 614, the generated classifier is applied to a received signature sample to authenticate the received signature sample, for example, by authentication module 206C.

Optionally, the authentication is performed based on the calculated mean, standard deviation and volatility factor for each feature, or for a group of features. Additional details of the exemplary authentication process are described herein with reference to block 114 of FIG. 1. Other authentication methods may be used.

Figure 3:
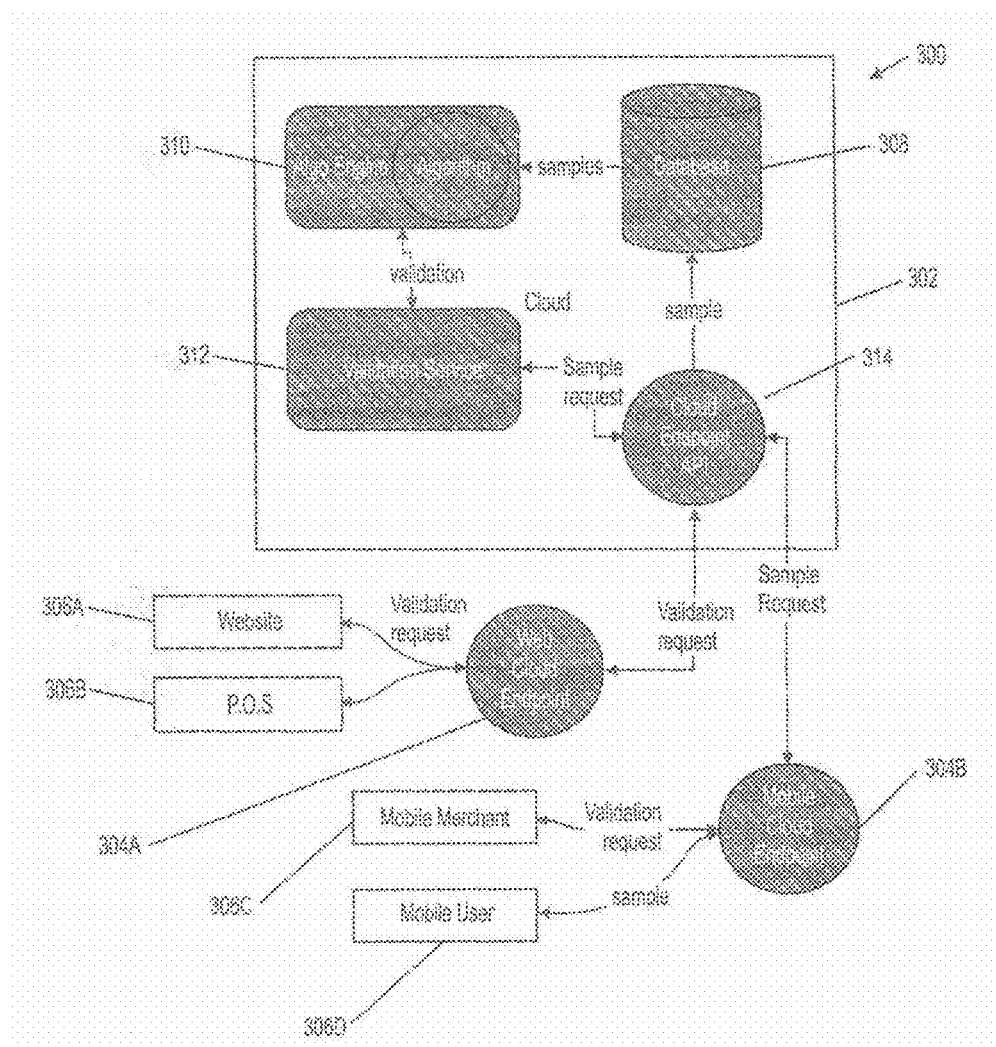
FIG. 3 is an exemplary implementation of the system of FIG. 2, in accordance with some embodiments of the present invention.

Reference is now made to FIG. 3, which is an exemplary implementation system 300 of system 200 of FIG. 2, in accordance with some embodiments of the present invention. System 300 may execute the method of FIG. 1. System 300 authenticates signatures based on stored user signature samples. System 300 may adapt to changes in the user signing pattern, for example, changes due to aging of the user.

System 300 is designed for implementation in a computing cloud 302. Implementation in cloud 302 allows separation of the virtual authentication services from the physical hardware on which the authentication systems reside. Cloud 302 may provide secure access. Components residing within cloud 302 may be scaled to meet user demands. Cloud 302 may provide the services of the central server described herein, for example, as described with reference to FIG. 2.

Optionally, cloud 302 provides end-points 304A-B for external entities (e.g., websites 306A, merchant point of service (POS) 306B, mobile merchant application 306C, mobile user 306D) to communication with the authentication system in cloud 302. Access to cloud 302 through end-points 304A-B may be secure (e.g., secure sockets layer (SSL)), and may contain built in session level authentication to help ensure that only registered merchants and/or users may communication with end-points 304A-B.

System 300 includes a database 308 within cloud 302. Database 308 contains user and/or merchant profile information and/or signature sample data. When a user authentication request is processed (whether successful or not), the sample signature data may be stored in database 308, marked with the authentication result. Adding the new stored signature sample(s) may enable machine learning, which may adjust the authentication process over time, for example, to changes in the patient signing process over time.

Cloud database 308 resources may be automatically and dynamically adjusted to accommodate the load of the system as the system changes and grows.

An algo engine module 310 executes an algorithm for statistical based authentication of received user signature samples, based on signature samples stored in database 308. The algorithm may perform authentication based on a generated classifier. Engine 310 creates a user profile for each registered user (e.g., in database 308). The classifier may be updated occasionally based on the user profile and/or stored signature samples.

Updating and/or generating the classifier may be performed in two stages, a first slow stage (e.g., performed offline) and a second short stage (e.g., performed in real time and/or during run time). The slow stage (e.g., performed overnight) uses the entire signature history of the user to generate a first classifier and/or profile values. The short stage (e.g., continuously performed, performed in response to an authentication request or other methods) is based on the first classifier and/or profile values, to generate a second classifier for authentication of signatures. The second classifier assigns greater importance to recent signatures samples.

When engine 310 receives an identification request (e.g., including a sample ID), engine 310 retrieves the signature sample from database 308, and performs a statistical authentication using the second classifier based on the user profile created by the algorithm. The authentication results are provided to the requesting component.

The cloud deployment of engine 310 may depend on the total number of users registered with system 300.

An authentication service module 312 manages the active identification transactions and sessions with the merchant system and/or user mobile devices. Authentication module 312 runs in cloud 302, and may be scaled as required based on demand.

Authentication module 312 may provide interfaces using cloud endpoint 304A-B, such as a web interface and a mobile interface. Merchant systems may communication using either endpoint 304A-B for making user identification requests from authentication module 312.

A cloud endpoint application programming interfaces (APIs) 314 may provide communication between authentication module 312 and a mobile application installed on mobile devices of merchants 306C and/or users 306D. Registered mobile devices that have obtained the appropriate cloud endpoint key may be allowed to communicate with authentication module 312, for example, as described below.

Deployment of authentication module 312 in cloud 302 may depend on the real time load of the identification requests being sent by merchant systems. The resources provided to authentication module 312 may be dynamically scaled, for example, to accommodate sudden increases in system load.

Cloud endpoints 304A-B provide access into cloud 302. External entities 306A-D may register with endpoints 304A-B to establish a secure, authenticated communication with authentication system components within cloud 302. Cloud endpoints 304A-B may be based on secure HTTP connections (e.g., SSL) to publicly established sub-domains, providing registration, authentication, and/or remote procedure call (RPC) type communication functionality to external entities 306A-D. External entities 306A-D that want to communicate with public endpoints 304A-B may require obtaining a registration key by a registration process. The key may be used to register with endpoint 304A-B for authentication services. After obtaining the endpoint key by the registration process and performing an authentication process, external entities 306A-D may gain access to endpoint 304A-B to make remote requests for authentication.

Figure 4:
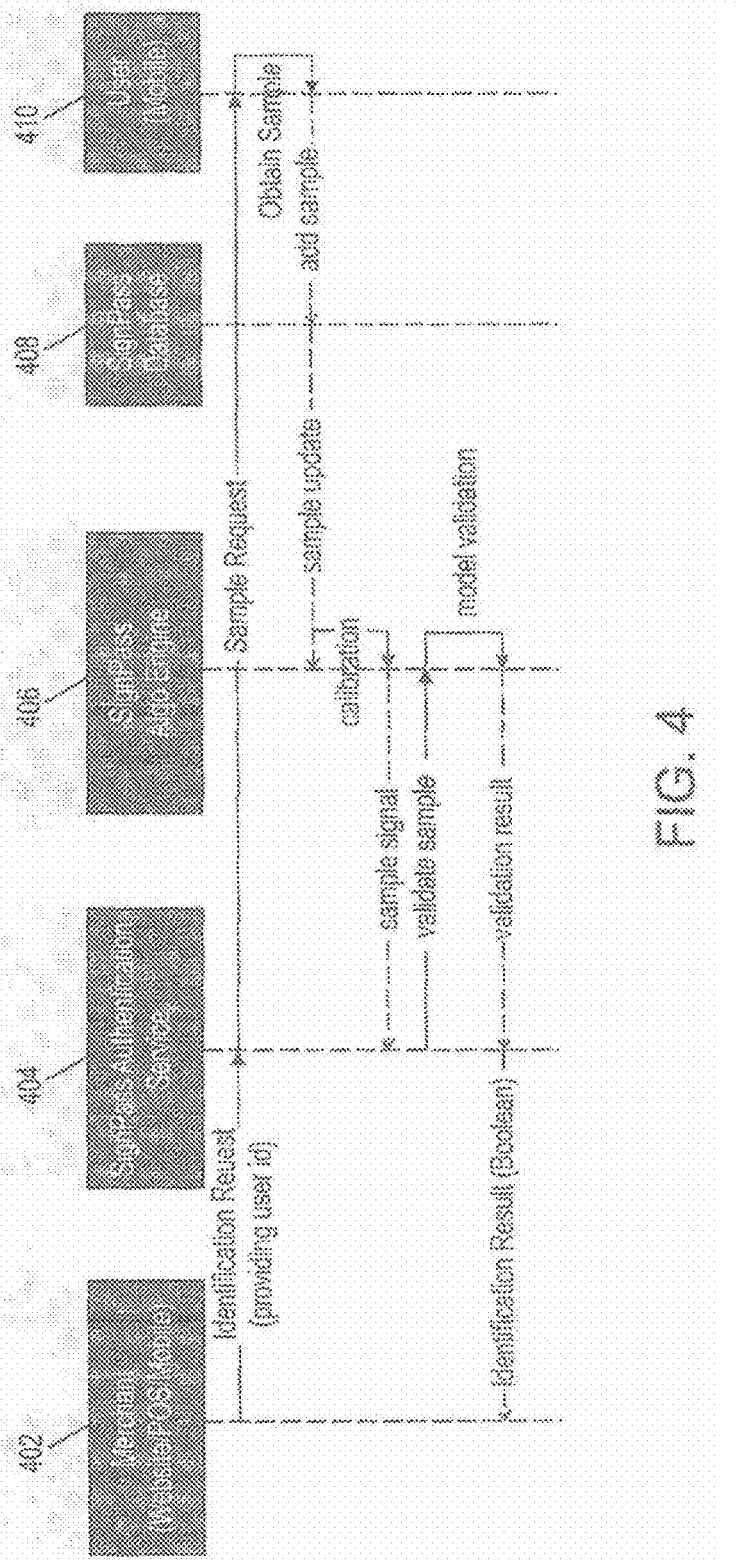
FIG. 4 is a flow diagram of an exemplary authentication process, in accordance with some embodiments of the present invention.

Reference is now made to FIG. 4, which is a flow diagram of an exemplary signature authentication process, in accordance with some embodiments of the present invention. FIG. 4 may be an exemplary implementation of the method of FIG. 1. The process of FIG. 4 may be implemented by system 200 of FIG. 2 and/or by system 300 of FIG. 3. The process of FIG. 4 provides an authentication based on signature samples of a user. The process of FIG. 4 may adapt to changes in the user signing pattern over time.

The user identity authentication process is triggered by a merchant 402 account, directly and/or on behalf of the user whose identify is being verified. The system of merchant 402 (e.g., website, POS, mobile merchant, or other systems) sends an Identification Request (optionally providing user ID) to an authentication service 404 (e.g., authentication service 312 of FIG. 3), requesting to authenticate the identity of a certain user. Communication between merchant 402 and authentication service 404 may be performed, for example, as described with reference to system 200 of FIG. 2 and/or system 300 of FIG. 3, for example, using secure cloud endpoints.

Upon receiving the identification request, authentication service 404 may perform an initial authentication of the user and/or request information. Once the initial authentication has been performed, a Sample Request may be sent to a user 410 for requesting a signature sample for authentication. The sample request may be sent to the registered mobile device (or other computer) of the user. The sample request may contain a generated challenge, which when combined with the device key (e.g., established during device registration) forms a sample encryption key for encrypting the serialized sample data.

The mobile device registered for the user may automatically self-register for incoming push notifications from authentication service 404, for example, when the mobile device is turned on. The push notifications notify the user of an incoming request for a signature sample.

When the user has provided the signature sample (Obtain Sample), the mobile device (e.g., mobile application installed thereon) uses the challenge received from the sample request, combined with the private device key obtained during device registration, to encrypt the sample information, which is then sent back to authentication service. The signature sample may be sent back using a dedicated, secure SSL mobile cloud endpoint (e.g., cloud endpoint 314 of FIG. 3), which is separate from the general access cloud endpoints exposed for merchants and user management requests (e.g., endpoints 304A-B of FIG. 3).

The signature sample received by the authentication system may be stored (add sample) in a database 408 (e.g., database 308 of FIG. 3), for example, a cloud database. Storing of the signature may trigger (sample update) an algo engine 406 (e.g., algo engine 310 of FIG. 3) to re-calibrate (calibration) the profile of the user with the latest signature information, such as updating a classifier generated for the user. Authentication service 404 may receive the signature sample (sample signal), and instruct algo engine 310 (validate sample) to perform a statistical analysis of the provided sample based on the historical profile of the user (e.g., by applying the generated classifier), to authenticate or not authenticate the signature sample (model validation).

The result of the signature sample may be provided to authentication service 404 (validation result) for delivery back to merchant 402 (Identification Result).

An exemplary process for establishing the identity of a user for registration of the user is now described. The exemplary process may be used as part of the user registration process of block 102 of FIG. 1, and/or as part of user registration with system 200 of FIG. 2 and/or system 300 of FIG. 3.

Establishing the user identity for the first time may be performed in order to generate the first authentication classifier based on the initial set of provided user signatures. The system does not have sufficient statistical information to validate the user based on existing stored signatures during the registration process. The exemplary process described may be used to establish the user's identity to allow the registration process.

The exemplary process may include one or more of the following:

1. A user downloads and installs the user mobile application (e.g., application 220 of FIG. 2).

2. Once installed the application prompts the user to initiate an optional new user registration wizard. Login to the authentication system is not possible at this step as no key exists to access the system for example, for the cloud end-points (e.g., 304A-B of FIG. 3).

3. The new user registration wizard uses a secure public web-service in order to obtain a temporary low-access registration key. This key allows limited access to the cloud end-point to the device (e.g. device 214 of FIG. 2) for the user registration process only.

4. The new user registration wizard requests input from the user for the relevant user registration information.

5. Upon receiving successful validation of the credentials, the registration process may undergo a challenge-response verification process using a generated pin transmitted to the target device, for example, via voice (e.g., phone) or short message service (SMS).

6. Once validated with the challenge-response process, the user is prompted to provide an initial set of signatures (e.g., sufficient number to generate an initial classifier within predefined tolerance limits). The user may adapt to signing on the touch-device, by being provided with the option to review and/or retry the registration signatures before submitting.

7. The authentication system (200 of FIG. 2, 300 of FIG. 3) may perform an initial algorithm calibration on the initial sample information which was captured during the previous step to determine whether the initial dataset is sufficient for establishing an initial user profile and/or initial classifier. When the user profile is established, the information is recorded into the cloud database (e.g., 206A of FIG. 2, 308 of FIG. 3). A successful result is sent back to the mobile application containing a device specific registration key.

8. The resulting registration key may be used in communication with the cloud-endpoint, only providing limited access to sample request functionalities. Management functionalities may only be enabled for the registration key once the user has enabled them on the specific device in the administration console.

9. Upon a successful test of an optional ping process with the authentication services system, the registration wizard closes, having successfully completed the user registration.

An exemplary process for registration of mobile device(s) of the user is now described. The exemplary process may be used as part of the user registration process of block 104 of FIG. 1, and/or as part of mobile device registration with system 200 of FIG. 2 and/or system 300 of FIG. 3.

Registration of mobile devices of the merchant (222 of FIG. 2, 306C of FIG. 3) and/or users (214 of FIG. 2, 306D of FIG. 3) may be required to communicate with the authentication system, for example, through cloud endpoint (e.g., 304B of FIG. 3). Communication may require an endpoint key, optionally in addition to performance of the initial authentication process. The endpoint key may be obtained by the initial registration process and/or through an administration console.

During the initial registration process described above, users undergo a multi-stage authentication using the mobile device with which they are registering. The registration process creates a temporary low-access key, which may later be replaced by a permanent key after successful completion.

Alternatively or additionally, users and/or merchants may obtain the endpoint key by adding a new mobile device to their account using the administration console feature of the mobile application. In order to add the new device, the respective mobile application is installed on the target device. Once launched, the user and/or merchant enter a unique identification number and request a device link to their user and/or merchant account. The device obtains a temporary low-access key that enables the registration functionality. The key is used to request a registration link to the user and/or merchant account. The user and/or merchant logs in to the account administration console. The new link request for the mobile device is pending in the console. The user and/or merchant are given the option to accept or reject the link request. When accepted a new, permanent, end-point key is generated and sent to the respective mobile device. This key is used in future communications with the cloud end-point to access the authentication system.

An exemplary process for registration of merchants is now described. The exemplary process may be used as part of the merchant registration process of block 106 of FIG. 1, and/or as part of merchant registration with system 200 of FIG. 2 and/or system 300 of FIG. 3.

Potential businesses and/or private merchants who wish to integrate their commerce systems with the authentication system, may perform a manual registration process, involving legal and/or billing contracts. During the manual registration process the business is provided with a merchant account identification and/or an access key, to provide the merchant with access to the system, optionally through cloud end-points (e.g., 304A-B of FIG. 3).

The business may begin to authenticate the identity of customers (i.e., users), by using built-in merchant web and/or mobile tools, and/or by integration business platform identification modules with the authentication system using provided APIs (e.g., 314 of FIG. 3).

The merchant mobile application (e.g., 224 of FIG. 2) provides for identification requests to be sent from different triggers, for example, NFC, Bluetooth, WiFi and/or direct connections. The merchant mobile application may provide a mobile platform link for other mobile applications for direct interaction.

Reference is now made to FIG. 5, which is a flowchart of an exemplary method of authentication signatures of users performing financial transactions, in accordance with some embodiments of the present invention. FIG. 5 may perform the authentication based on the methods described with reference to FIG. 1 and/or FIG. 4. FIG. 5 may be implemented based on the systems described with reference to FIG. 2 and/or FIG. 3.

The authentication systems and/or methods may be integrated into financial transaction processing systems. A real-time, mobile solution may be provided for different types of financial processing platforms, for example, e-wallet, online, phone, and/or other point of service type transaction systems. The authentication systems and/or methods may be seamlessly integrated with financial cleaning institutions to provide real-time authentication of user transactions. The methods and/or systems may authenticate the identity of the potential user before performing any financial transaction, whether using an e-wallet ID online, on the phone, swiping a credit and/or debit card, using an NFC type transaction system, or other systems for financial transactions.

Using the authentication systems and/or methods, when the user initiates a financial transaction with a potential merchant, before the transaction is approved by the clearing company, the authentication system receives the transaction request and authenticates the user in real-time. Only after successful authentication does the authentication system notify the clearing company to process the transaction request.

Integration with e-Wallet and/or m-Payment platforms may provide potential users with the ability to perform financial transactions and/or validate their identity using a (optional single) unique identification number. By using the unique identification number, potential users may keep private and/or personal identifying information (e.g., bank account number, credit card number, addresses, phone numbers, social security number, passport numbers) discrete while still being able to perform secure and/or authenticated transactions in real-time. The unique identification number may be stored and/or used by the user mobile application (e.g., 220 of FIG. 2) when performing the authentication, or based on other methods, for example, encrypted on mobile device (e.g., 214 of FIG. 2).

At 502, the customer (i.e., user) initiates a financial transaction. The financial transaction may be based on the unique identification number.

At 504, the merchant informs a cleaning company of the transaction.

At 506, the cleaning company sends a user authentication request to the authentication system.

At 508, the authentication system sends a signature request to the mobile device of the user.

At 510, the user provides the signature sample.

At 512, the authentication system analyses the signature sample for authenticity of the user identify. The authentication result is provided to the cleaning company.

At 514, based on the authentication results the cleaning company accepts (e.g., authenticated result) or rejects (e.g., not authenticated result) the proposed financial transaction.

At 516, the cleaning company sends a message back to the merchant, acknowledging or rejecting the proposed financial transaction.

At 518, the purchase has been completed (or rejected). The user may be informed of the result of the proposed financial transaction.

It is noted that some blocks are optional, and some blocks may be modified, for example, based on the above descriptions of related systems and/or methods.

The authentication methods and/or systems described herein may be used to authenticate users for insurance purposes. Optionally, the systems and/or methods are integrated with the potential insurance issuer's platform to perform identity authentication of the potential policy holder, optionally in real-time, as the insurance policy requires. In the insurance businesses, the potential policy holder is sometimes required to identify themselves, for example, while establishing the policy, while filing a claim, and/or at other steps of the insurance process. Examples of insurance related identification cases which may leverage the signature authentication methods and/or systems include: identification of consumers while purchasing prescription medication; identification of a potential mortgage applicant during closing; identification of potential customers while applying for automobile or home insurance.

The authentication methods and/or systems described herein may be integrated as features within other platform based products, to provide businesses with tools to create systems and/or website for their businesses. Potential businesses (e.g., retail, commercial, and/or private individuals) who wish to build their internal and/or public facing platform may select the authentication systems and/or methods as a user authentication feature within their platform, to identify the users of that platform before giving them relevant access.

It is noted that the authentication methods and/or systems described herein may be used in non-sales and/or non-financial environments, for example, to authenticate users in order to provide the users with remote access into secure private networks, to authenticate users in order to provide access into personal electronic accounts, or other secure environments. The signature authentication methods and/or systems may be integrated with a wide variety of access control systems, for example, virtual (e.g., software applications, websites, devices, or other virtual access) and/or physical (doors, safes, cars, windows, or other physical access). Using the signature authentication methods and/or systems, an access control system which has access to the internet may be provided with the ability to send real-time authentication requests in order to identify the potential users of the system and provide or deny access based on the authentication process results.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the terms classifier, electronic input device and mobile device are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for training a classifier for authenticating signatures hand-drawn on an electronic input element, comprising:

receiving a set of a plurality of signature properties of each of a plurality of signatures documented over a time range of a common user, wherein a respective set of the plurality of signature properties is associated with a time period during which a respective signature was documented at the time range, wherein the plurality of signatures were hand-drawn and digitally recorded using an electronic input element;

generating a signature authenticating classifier for authenticating additional signatures of the common user based on the set of the plurality of signature properties of each of the plurality of signatures, wherein a classifier weight assigned to at least a portion of the plurality of signature properties of each set of the plurality of signature properties decreases over time, and the classifier weight is used for the generation of the classifier;

providing the signature authenticating classifier for authenticating the additional signatures;

assigning a first set of feature specific weight coefficients based on statistical patterns of the set of the plurality of signature properties of each of the plurality of signatures from a plurality of different users; and at least one of:

assigning a second set of feature specific weight coefficients, and adapting the first set of feature specific weight coefficients to a specific common user, based on common user specific historical patterns, wherein the first set of feature specific weight coefficients represent relative importance of features in classification.

2. The method of claim 1, wherein generating the signature authenticating classifier comprises:
generating a first baseline classifier based on the set of plurality of signature properties of each of the plurality of signatures documented over the time range to provide a baseline for generation of a second authentication classifier; and
generating the second authentication classifier based on a subset of the set of plurality of signature properties of each of the plurality of signatures having more recent time periods, using the first classifier as the baseline.

3. The method of claim 2, wherein the first classifier is generated based on static characteristics of features extracted from the set of plurality of signature properties of each of the plurality of signatures documented over the time range, and the second classifier is generated based on dynamic characteristics of features extracted from the subset of set of plurality of signature properties of each of the plurality of documented signatures.

4. The method of claim 1, wherein generating the signature authenticating classifier comprises:
calculating a plurality of adjustment factors based on the set of plurality of signature properties of each of the plurality of signatures documented over the time range, the adjustment factors providing baseline values for classification;
training the signature authenticating classifier based on the set of plurality of signature properties of each of the plurality of signatures having assigned classifier weights; and
calibrating the signature authenticating classifier based on the adjustment factors to adapt the generated signature authenticating classifier to time related changes of the set of plurality of signature properties of each of the plurality of signatures.

5. The method of claim 1, further comprising extracting a plurality of features from the set of plurality of signature properties of each of the plurality of signatures for generating the classifier, the features including non-visual features that differ when the signature for authentication is visually indistinguishable to the signatures, wherein the non-visual features include at least one member of a group consisting of: duration of maximum speed, duration of the first stroke, duration of the whole signature, action of pointer, pressure applied by pointer to a screen, orientation of pointer relative to the screen.

6. The method of claim 5, wherein the non-visual features denote aspects of the signing process related to muscle memory and/or intuitive movement.

7. A method for authenticating signatures hand-drawn and digitally recorded using an electronic input element, comprising:
receiving a signature authentication classifier for authenticating signatures of a common user based on a set of a plurality of signature properties of each of a plurality of signatures of the common user documented over a time range, wherein a classifier weight assigned to at least a portion of the plurality of signature properties of each set of a plurality of signature properties decreases over time, and the classifier weight is used for the generation of the classifier;
receiving, from the common user, a signature for authentication, the signature being hand-drawn and digitally recorded using an electronic input element; and
authenticating the received signature by applying the classifier to the received signature, wherein authenticating comprises:
calculating mean and standard deviation from weighted features of the signature authentication classifier;
extracting features from the signature for authentication;
comparing the extracted features within tolerance boundaries based on the calculated mean and standard deviation of the weighted features of the classifier;
calculating a user volatility factor; and
comparing the extracted features within tolerance boundaries that vary based on the user volatility factor.

8. The method of claim 7, further comprising calculating a user volatility factor based on features extracted from the set of plurality of signature properties of each of plurality of signatures of the common user, the volatility factor denoting the accuracy of similarity between time spaced signatures of the common user and the received signature, and authenticating comprises verifying that features extracted from the received signature are within a tolerance level based on the calculated user volatility factor.

9. The method of claim 7, further comprising documenting the received signature and authentication result, and updating the signature authenticating classifier based on the documented received signature and authentication result, so that the classifier adapts to changes of the common user signatures over time.

10. The method of claim 7, wherein applying the classifier comprises:
extracting features from the received signature for authentication;
weighing each of the extracted features using calculated feature specific coefficients from the received signature authenticating classifier;
counting the total number of features that pass a variance check (referred to as a pass count) for each feature, the variance check for each feature denoted by the relationship:

$$(\text{Feature} - \text{Mean}) <= (\text{Stddv} * \text{Volatility})$$

wherein:
Feature denotes the values of the respective weighted extracted feature;
Mean denotes the mean value of the respective feature for the signatures;
Stddv denotes the standard deviation value of the respective feature for the signatures;
Volatility denotes the volatility factor of the respective feature for the signatures;
the Mean, Stddv, and Volatility obtained from the received signature authenticating classifier; and
authenticating the received signature based on the relationship:

$$(\text{Pass Count}) >= \text{Threshold};$$

wherein Pass count denotes the total number of extracted features that passed the variance check;
wherein Threshold denotes the number of extracted features that need to pass the variance check in order to authenticate the signature.

11. A system for authenticating signatures hand-drawn on an electronic input element, comprising:
a processor;
a memory having stored thereon program modules for instruction execution by the processor, comprising:

a signature database storing a set of a plurality of signature properties of each of a plurality of signatures documented over a time range of a common user, wherein a respective set of a plurality of signature properties is associated with a time period during which a respective signature was documented at the time range, wherein the plurality of signatures were hand-drawn and digitally recorded using an electronic input element;

a classifier generation module for generating a signature authenticating classifier for authenticating additional signatures of the common user based on the set of the plurality of signature properties of each of the plurality of signatures, wherein a classifier weight assigned to at least a portion of the plurality of signature properties of each set of the plurality of signature properties decreases over time, and the classifier weight is used for the generation of the classifier; and an authentication module for authenticating a signature received from a user, by applying the classifier to the received signature, the authentication module configured to:
  calculate mean and standard deviation from weighted features of the signature authentication classifier;
  extract features from the signature for authentication;
  compare the extracted features within tolerance boundaries based on the calculated mean and standard deviation of the weighted features of the classifier;
  calculate a user volatility factor; and
  compare the extracted features within tolerance boundaries that vary based on the user volatility factor.

12. The method of claim 7, wherein
said receiving, from the common user, a signature for authentication, comprises receiving from the common user, at a client terminal, the signature for authentication, the signature for authentication being hand-drawn and digitally recorded using an electronic input element;

the method further comprises transmitting the signature for authentication or the plurality of signature properties of the signature for authentication to a central server;

said authenticating comprises authenticating the received signature of the common user, at the central server, by applying said signature authentication classifier generated based on a set of a plurality of signature properties of each of a plurality of signatures documented over a time range of the common user, wherein said classifier weight is calculated based on a combination of at least one of:

(i) common user specific coefficients and multi-user coefficients; and (ii) static features and dynamic features, the features extracted from the set of plurality of signature properties of each of the plurality of signatures documented over the time range, the classifier weight is used for the generation of the classifier; and the method further comprises providing the authentication result.

13. The method of claim 12, wherein the combination of common user specific coefficients and multi-user coefficients comprises a combination based on at least one selected from the list consisting of: uniqueness of certain signature properties of the common user relative to other multiple users; a selected prioritization of signature properties for the common user relative to other multiple users; and differences of signature properties between the common user and multiple users that are dynamic and/or unique over time.

14. The method of claim 12, further comprising re-training the signature authentication classifier based on received signatures from different common users and the related classification results.

15. The method of claim 12, wherein authenticating further comprises calculating a user volatility factor based on the dynamic and/or static extracted features, the volatility factor denoting the accuracy of similarity between time spaced signatures of the common user and the received signature, and verifying that dynamic and/or static features extracted from the received signature are within a respective dynamic and/or static tolerance level based on the calculated user volatility factor.

16. The method of claim 12, wherein the static features are based on the shape of the signatures and/or general formation pattern of the signatures and wherein the dynamic features are based on at least one member of a group consisting of: duration of formation, time related to the signature formation, speed, acceleration, pressure, tilt of the pointer relative to the signing plane, correlations between parameters, correlations of time and/or duration of various conditions, correlations of various properties of top and/or bottom part of the signatures, correlations of pressure at various conditions, correlations of tilt at various conditions.

17. The method of claim 12, wherein the dynamic features include at least one member of a group consisting of: Total duration, Write duration, Duration between first and second stroke, Duration of longest stroke, Time of start of second stroke, Number of points, Average speed, Maximum speed, Standard deviation of speed, Average horizontal speed, Maximum horizontal speed, Minimum horizontal speed, Standard deviation of horizontal speed, Average vertical speed, Maximum vertical speed, Minimum vertical speed, Standard deviation of vertical speed, Average acceleration, Maximum acceleration, Standard deviation of acceleration, Average pressure, Maximum pressure, Standard deviation of pressure, Average tilt, Maximum tilt, Standard deviation of tilt, Time of maximum x, Time of minimum x, Time of maximum speed, Time of minimum speed, Time of maximum horizontal speed, Time of minimum horizontal speed, Time of maximum vertical speed, Time of minimum vertical speed, Time of maximum acceleration, Duration of going up, Duration of going down, Duration of going right, Duration of going left, Total time of top quarter, Total time of bottom quarter, Average speed of top quarter, Average speed of bottom quarter, Average acceleration of top quarter, Average acceleration of bottom quarter, Pressure at point of maximum speed, Pressure at point of minimum speed, Pressure at point of maximum acceleration, Pressure at point of maximum curvature, Average pressure of going up, Average pressure of going down, Average pressure of going left, Average pressure of going right, Tilt at point of maximum speed, Tilt at point of minimum speed, Tilt at point of maximum acceleration, Tilt at point of maximum curvature, Average pressure of going up, Average pressure of going down, Average pressure of going left, Average pressure of going right, Tilt at point of maximum x, Tilt at point of minimum x, Tilt at point of maximum y, Tilt at point of minimum y.

18. The method of claim 12, wherein the dynamic features include at least one member of a group consisting of: Number of stokes, Start direction, End direction, Average direction of the longest stroke, Start direction of second stroke, Direction from start of first stroke to start of second stroke, Direction from end of first stroke to start of second stroke, Medium direction, Direction from start to end, Direction from start to center, Direction from end to center, Area, Aspect ratio, Length, Length/Area ratio, Difference of x of start to minimum, Difference of x of start to maximum, Difference of y of start to minimum, Difference of y of start to maximum, Difference of x of end to minimum, Difference of x of end to maximum, Difference of y of end to minimum, Difference of y of end to maximum, Number of change in x direction, Number of change in y direction, Standard deviation of x, Standard deviation of y.

* * * * *